US012287956B2

(12) United States Patent
Tuo et al.

(10) Patent No.: US 12,287,956 B2
(45) Date of Patent: Apr. 29, 2025

(54) SPEAKING USER SELECTING METHOD AND APPARATUS, ELECTRONIC DEVICE, AND STORAGE MEDIUM

(71) Applicant: BEIJING BYTEDANCE NETWORK TECHNOLOGY CO., LTD., Beijing (CN)

(72) Inventors: Zhipeng Tuo, Beijing (CN); Dongyun Yang, Beijing (CN); Jie Li, Beijing (CN); Qinyan Zhang, Beijing (CN); Yulu Wang, Beijing (CN); Jinpeng Shi, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/399,275

(22) Filed: Dec. 28, 2023

(65) Prior Publication Data

US 2024/0134502 A1 Apr. 25, 2024

Related U.S. Application Data

(63) Continuation of application No. PCT/CN2022/124112, filed on Oct. 9, 2022.

(30) Foreign Application Priority Data

Nov. 22, 2021 (CN) .......................... 202111384935.0

(51) Int. Cl.
*G06F 3/048* (2013.01)
*G06F 3/0484* (2022.01)

(52) U.S. Cl.
CPC ................................. *G06F 3/0484* (2013.01)

(58) Field of Classification Search
CPC ....................................................... G06F 3/0484
See application file for complete search history.

(56) References Cited

U.S. PATENT DOCUMENTS

| 7,877,282 B2 * | 1/2011 | Brady | G06Q 10/06311 |
| | | | 705/7.12 |
| 8,436,888 B1 * | 5/2013 | Baldino | H04N 7/152 |
| | | | 348/14.08 |

(Continued)

FOREIGN PATENT DOCUMENTS

| CN | 101207839 A | | 6/2008 | |
| CN | 101801485 A | * | 8/2010 | ............... A63H 3/28 |

(Continued)

OTHER PUBLICATIONS

Displaying Active Speaker Video in a Meeting, Yang et al., 2017, IP.com, 12 pages. (Year: 2017).*

(Continued)

*Primary Examiner* — Linh K Pham

(57) ABSTRACT

A speaking user selecting method and apparatus, an electronic device, a storage medium, a computer program product, and a computer program. The method comprises: receiving a first request sent by a first terminal device, the first request being used for determining a speaking user in a user group, wherein the user group comprises at least two users to be selected, and each user to be selected corresponds to one second terminal device; determining a random selection model corresponding to the first request, the random selection model being used for representing a policy for randomly determining a speaking user from the user group; and determining a speaking user from the at least two users to be selected according to the random selection model, and sending identification information of the speaking user to the first terminal device and the second terminal device.

7 Claims, 10 Drawing Sheets

(56) References Cited

U.S. PATENT DOCUMENTS

| | | | | |
|---|---|---|---|---|
| 8,781,841 | B1* | 7/2014 | Wang | H04M 3/56 704/275 |
| 9,554,091 | B1* | 1/2017 | Malegaonkar | H04N 7/152 |
| 9,699,409 | B1* | 7/2017 | Reshef | H04N 7/15 |
| 10,904,486 | B2 | 1/2021 | Van Os et al. | |
| 11,082,465 | B1* | 8/2021 | Chavez | G06V 40/18 |
| 2004/0174830 | A1* | 9/2004 | Koskelainen | H04L 12/1822 709/204 |
| 2004/0225526 | A1* | 11/2004 | Gould | G06Q 30/02 705/1.1 |
| 2007/0260684 | A1* | 11/2007 | Sharma | H04L 12/1818 709/204 |
| 2007/0263821 | A1* | 11/2007 | Shaffer | H04M 3/42187 379/202.01 |
| 2009/0220065 | A1* | 9/2009 | Ahuja | H04M 3/569 379/202.01 |
| 2009/0259970 | A1* | 10/2009 | Hawkins | H04L 67/306 709/227 |
| 2010/0153497 | A1 | 6/2010 | Sylvain et al. | |
| 2013/0109425 | A1* | 5/2013 | Kerger | H04M 1/72469 455/518 |
| 2013/0109426 | A1* | 5/2013 | Kerger | H04W 4/08 455/518 |
| 2013/0198656 | A1* | 8/2013 | Jones | H04L 65/403 715/753 |
| 2016/0073059 | A1* | 3/2016 | Bader-Natal | H04N 7/148 348/14.03 |
| 2016/0299672 | A1 | 10/2016 | Lindenberg et al. | |
| 2017/0041556 | A1* | 2/2017 | Aiba | H04N 5/77 |
| 2018/0063480 | A1* | 3/2018 | Luks | H04N 7/147 |
| 2018/0359366 | A1 | 12/2018 | Moncomble | |
| 2019/0088153 | A1* | 3/2019 | Bader-Natal | H04N 7/147 |
| 2019/0238489 | A1 | 8/2019 | Cohen | |
| 2022/0131979 | A1* | 4/2022 | Pham | H04L 65/1089 |
| 2022/0224554 | A1* | 7/2022 | Hassan | H04L 49/90 |
| 2022/0224735 | A1* | 7/2022 | Tokuchi | H04L 65/403 |
| 2022/0286313 | A1* | 9/2022 | Nouri | H04L 12/1822 |
| 2024/0037961 | A1* | 2/2024 | Kaku | G06T 7/73 |

FOREIGN PATENT DOCUMENTS

| | | | | |
|---|---|---|---|---|
| CN | 103918289 | A * | 7/2014 | G06F 3/04817 |
| CN | 104933050 | A | 9/2015 | |
| CN | 105204846 | A | 12/2015 | |
| CN | 105827498 | A | 8/2016 | |
| CN | 114124591 | A | 3/2022 | |
| CN | 114448951 | A * | 5/2022 | |

OTHER PUBLICATIONS

Method and System for Facilitating Attendance of a User in Multiple Simultaneous Conference Calls, Authors et al., 2014, IP.com, 5 pages. (Year: 2014).*
International Search Report mailed Dec. 12, 2022 in International Application No. PCT /CN2022/124112.
First Office Action mailed May 23, 2023 in Chinese Application No. 202111384935.0.
Second Office Action mailed Aug. 30, 2023 in Chinese Application No. 202111384935.0.
Third Office Action mailed Dec. 4, 2023 in Chinese Application No. 202111384935.0.
European Search Report for EP Patent Application No. 22894507.7, Issued on Sep. 27, 2024, 9 pages.

* cited by examiner

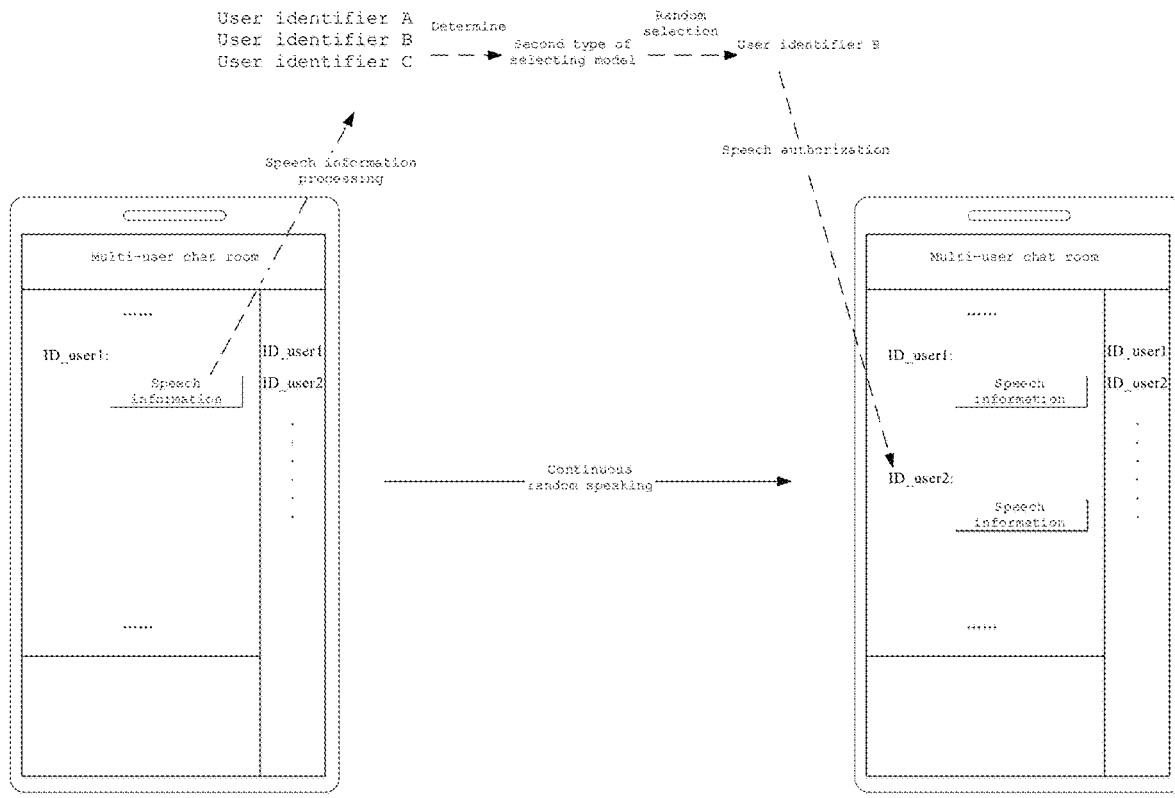

Fig. 9

S301
A first request is sent to the server for requesting the server to determine a speaking user in a user group, wherein the user group comprises at least two candidate users, each of which corresponds to a second terminal S302
The identification information sent by the server is received, and the identification information is used to indicate a speaking user.

S303
A user identifier of the speaking user is highlighted in the multi-user interactive interface according to the identification information.

Fig. 10

SPEAKING USER SELECTING METHOD AND APPARATUS, ELECTRONIC DEVICE, AND STORAGE MEDIUM

CROSS-REFERENCE TO RELATED APPLICATIONS

This application is a continuation of International Application No. PCT/CN2021/124112, as filed on Oct. 9, 2022, which claims priority to China Patent Application No. 202111384935.0 filed on Nov. 22, 2021, the title of which is "SPEAKING USER SELECTING METHOD AND APPARATUS, ELECTRONIC DEVICE, AND STORAGE MEDIUM", which is incorporated by reference in the present application in its entirety.

TECHNICAL FIELD

The embodiment of the disclosure relates to the field of computer technology, in particular to a speaking user selecting method and apparatus, an electronic device, a storage medium, a computer program product and a computer program.

BACKGROUND

With the enhanced Internet penetration rate and the increasingly abundant Internet products and ecosystems, the mass also have more and more needs for social activities based on Internet. At present, the multi-user chat room based on text, voice and video is a common Internet application scenario, and the users in the multi-user chat room may communicate and interact with each other by sending a text, voice or video or the like. Note that the term "speaking" as used herein concerns sending a message in a form of a live stream, a video/voice call, a video/audio message, a voice message, a text message, etc. The term "a speaking user" as used herein refers to a user activate to speak, i.e., a user in a chat room activate to send a message in a form of a live stream, a video/voice call, a video/audio message, a voice message, a text message, etc. A speaking user can speak in a chat room in various scenarios such as a meeting, a chat, an interactive activity, a social game, etc.

At present, with the continuous subdivision of the user needs and the product functions, the application scenarios of the multi-user chat room are also refined, so as to comprise therein both a user group chat room comprising only a few acquainted users and a live chat room comprising tens of thousands of unacquainted users; in some specific scenarios, it is necessary to control a speaking of a user in a chat room so as to avoid the interference of an invalid user speaking with an effective user speaking, thereby achieving the purpose of specific social activities.

However, in the prior art, when a user is selected to address speaking, a speaking user is selected usually based on the permission of the manager, that is, the manager designates a speaking user, and the permitted speaking user addresses a speaking. This leads to a fixed speaking user selecting method, which limits a flexible implementation of social activities based on the multi-user chat room, and reduces the fun and diversity of social activities through the multi-user chat room.

SUMMARY

The embodiment of the disclosure provides a speaking user selecting method and apparatus, an electronic device, a storage medium, a computer program product and a computer program, so as to solve the problem of a fixed speaking user selecting method in the prior art, which limits a flexible implementation of social activities based on the multi-user chat room.

In a first aspect, according to an embodiment of the present disclosure, a speaking user selecting method is provided, the method comprising:
  receiving a first request sent by a first terminal device for requesting the server to determine a speaking user in a user group, wherein the user group comprises at least two candidate users, each of which corresponds to a second terminal device; determining a random selecting model corresponding to the first request, wherein the random selecting model is used to be representative of a strategy of randomly determining the speaking user from the user group; and determining the speaking user from the at least two candidate users according to the random selecting model, and sending the identification information of the speaking user to the first terminal device and the second terminal device.

In a second aspect, according to an embodiment of the present disclosure, a speaking user selecting method is provided, the method comprising:
  sending a first request for requesting to determine a speaking user in a user group, wherein the user group comprises at least two candidate users, each of which corresponds to a terminal device; receiving the identification information, wherein the identification information is used to indicate the speaking user; and highlighting a user identifier of the speaking user in a multi-user interactive interface according to the identification information.

In a third aspect, according to an embodiment of the present disclosure, a speaking user selecting apparatus is provided, the apparatus comprising:
  a receiving module configured to receive a first request sent by a first terminal device for requesting a server to determine a speaking user in a user group, wherein the user group comprises at least two candidate users, each of which corresponds to a second terminal device;
  a first determining module configured to determine a random selecting model corresponding to the first request, wherein the random selecting model is used to be representative of a strategy of randomly determining the speaking user from the user group;
  a second determining module configured to determine the speaking user from the at least two candidate users according to the random selecting model; and
  a sending module configured to send the identification information of the speaking user to the first terminal device and the second terminal device.

In a fourth aspect, according to an embodiment of the present disclosure, a speaking user selecting apparatus is provided, the apparatus comprising:
  a sending module configured to send a first request for requesting to determine a speaking user in a user group, wherein the user group comprises at least two candidate users, each of which corresponds to a terminal device;
  a receive module configured to receive the identification information for indicating the speaking user; and
  a display module configured to highlight a user identifier of the speaking user in a multi-user interactive interface according to the identification information.

In a fifth aspect, according to one or more embodiments of the present disclosure, an electronic device is provided, the electronic device comprising:

a processor, and a memory communicatively connected with the processor;

wherein the memory has computer-executed instructions stored thereon; and the processor executes the computer-executed instructions stored in the memory to implement the speaking user selecting method as described in the first aspect and various possible designs of the first aspect above.

In a sixth aspect, according to one or more embodiments of the present disclosure, an electronic device is provided, the electronic device comprising:

a processor, and a memory communicatively connected with the processor;

wherein the memory has computer-executed instructions stored thereon; and the processor executes the computer-executed instructions stored in the memory to implement the speaking user selecting method as described in the second aspect and various possible designs of the second aspect above.

In a seventh aspect, according to one or more embodiments of the present disclosure, a computer-readable storage medium is provided, the computer-readable storage medium having computer-executable instructions stored thereon that, when executed by a processor, implement the speaking user selecting method as described in the first aspect and various possible designs of the first aspect above, or implement the speaking user selecting method as described in the second aspect and various possible designs of the second aspect above.

In an eighth aspect, according to one or more embodiments of the present disclosure, a computer program product is provided, the computer program product comprising a computer program that, when executed by a processor, implements the speaking user selecting method as described in the first aspect and various possible designs of the first aspect above, or implements the speaking user selecting method as described in the second aspect and various possible designs of the second aspect above.

In a ninth aspect, according to one or more embodiments of the present disclosure, a computer program is provided, which, when executed by a processor, implements the speaking user selecting method as described in the first aspect and various possible designs of the first aspect above, or implements the speaking user selecting method as described in the second aspect and various possible designs of the second aspect above.

In a speaking user selecting method and apparatus, an electronic device, a storage medium, a computer program product and a computer program provided by this embodiment, this method comprises receiving a first request sent by a first terminal device for requesting a server to determine a speaking user in a user group, wherein the user group comprises at least two candidate users, each of which corresponds to a second terminal device; determining a random selecting model corresponding to the first request, wherein the random selecting model is used to be representative of a strategy of randomly determining the speaking user from the user group; determining a speaking user from the at least two candidate users according to the random selecting model, and sending the identification information of the speaking user to the first terminal device and the second terminal device. After the first terminal sends a first request for determining a speaking user in the user group to the server, the server will automatically determine a corresponding random selecting model, and automatically select a speaking user based on the random selecting model, thus, in this process, the manager does not have to manually select a speaking user, so that in a specific scenario of social activities, it is possible to improve the smoothness and fun during the process of carrying out social activities based on a multi-user chat group, and expand a flexible and diversified implementation of social activities.

BRIEF DESCRIPTION OF THE ACCOMPANYING DRAWINGS

In order to more explicitly explain the technical solutions in the embodiments of the present disclosure or the prior art, a brief introduction will be given below for the accompanying drawings required to be used in the description of the embodiments or the prior art; it is obvious that, the accompanying drawings illustrated below are some of the embodiments of the present disclosure, and for those of ordinary skill in the art, other accompanying drawings may also be obtained according to such accompanying drawings on the premise that no inventive effort is involved.

FIG. 9 is a schematic view of a process of continuous random speaking based on the speaking information provided by an embodiment of the present disclosure;

FIG. 10 is a third flowchart of a speaking user selecting method provided by an embodiment of the present disclosure;

DETAILED DESCRIPTION

In order to make the objects, technical solutions and advantages of the embodiment of the present disclosure more explicit, the technical solution in the embodiment of the present disclosure will be explicitly and fully described in conjunction with the accompanying drawings in the embodiment of the present disclosure; apparently, the embodiments described are some embodiments of the present disclosure, rather than all of the embodiments. On the basis of the embodiments of the present disclosure, all the other embodiments obtained by those of ordinary skill in the art on the premise that no inventive effort is involved shall fall into the protection scope of the present disclosure.

Figure 1:
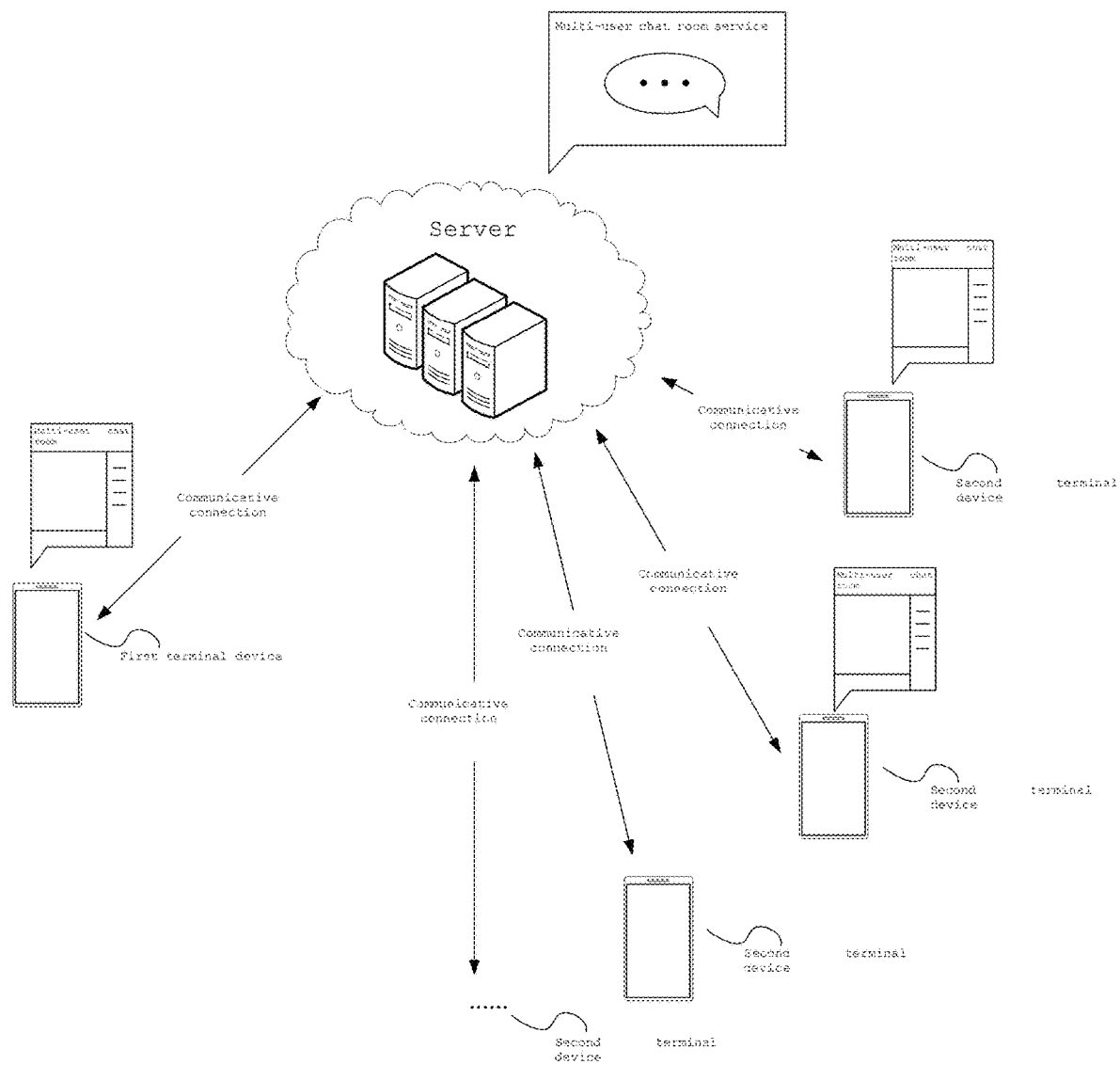
FIG. 1 is an application scenario view of a speaking user selecting method provided by an embodiment of the present disclosure.

The application scenario of the embodiment of the present disclosure will be explained below:

FIG. 1 is an application scenario view of a speaking user selecting method provided by an embodiment of the present disclosure, wherein the speaking user selecting method provided by the embodiment of the present disclosure may be applied to a scenario of a multi-user chat room, and more specifically, to a scenario of a multi-user chat room with a theme of social activities. Wherein, the multi-user chat room referred to in the embodiment of the present disclosure may be a network chat application based on the BS or CS architecture, that is, a virtual chat room interface displayed a browser, or a virtual chat room and chat group displayed by an application (APP) by way of a terminal device accessing the server which runs the relevant service. For example, as shown in FIG. 1, the method provided by the embodiment of the present disclosure may be applied to a server, wherein a first terminal device and a plurality of second terminal devices are communicatively connected with the server respectively, and the first terminal device and the plurality of second terminal devices access the server and log in to the multi-user chat room with corresponding user names respectively by entering the multi-user chat room service provided by the server. For example, the first terminal device and the second terminal device both have touch screens for display and instruction interaction, and more specifically, the first terminal device and the second terminal device are smart phones, for example. When the first terminal device and the second terminal device enter the multi-user chat room, the first terminal device and the second terminal device may display at least one user who enters the multi-user chat room through the touch screen. Wherein, the first terminal device corresponds to a user with management authority in the multi-user chat room, for example, a group owner and a manager; and the second terminal device corresponds to a general user in the multi-user chat room. After the first terminal device sends a first request for automatically selecting a speaking user to the server, the server will automatically select a general user corresponding to the second terminal device as a speaking user from the multi-user chat room, and offer a speaking permission to the speaking user, so that the speaking user may address speaking in the multi-user chat group, while other users are not allowed to address speaking.

Figure 2:
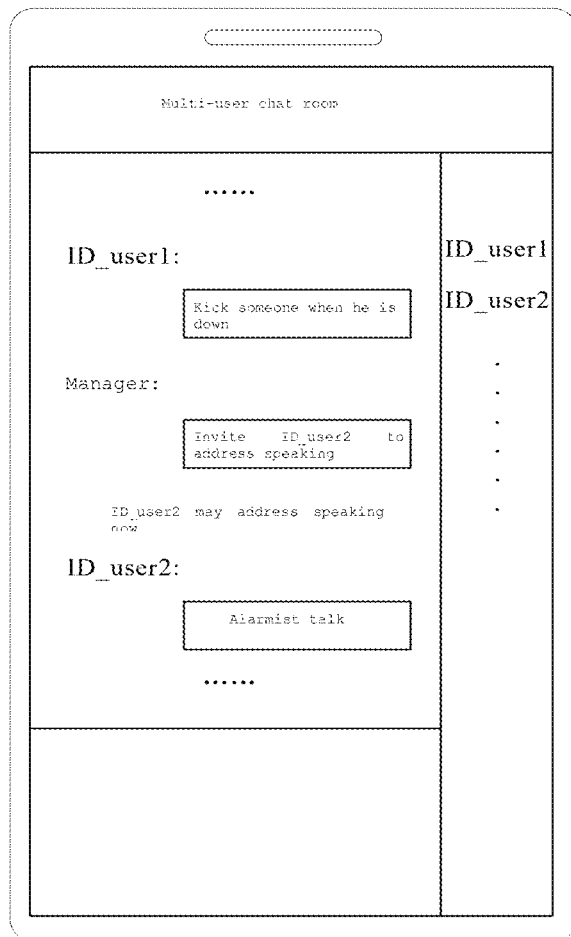
FIG. 2 is a schematic view of a social game based on a multi-user chat room provided by an embodiment of the present disclosure.

The method provided in this embodiment may be specifically applied to a scenario of the multi-user chat room with a theme of social activities, for example, to social games participated by users and based on the multi-user chat room, more specifically, for example, "Idioms Solitaire", "Songs Solitaire", and the like. After a previous speaking user in the chat room finishes a speaking, it is necessary to select a next speaking user to address speaking, so as to complete the above-described social game activities. FIG. 2 is a schematic view of a social game based on a multi-user chat room provided by an embodiment of the present disclosure; referring to FIG. 2, FIG. 2 exemplarily demonstrates a schematic view of a process of "Idioms Solitaire" in the multi-user chat room; in the prior art, after a previous speaking user addresses a speaking (as shown in the accompanying drawing, the user named ID_user1 inputs the words "Kick someone when he is down"), the selection of a next speaking user is usually based on the permission of a manager; that is, the manager designates a speaking user (the user named as a manager in the accompanying drawing inputs "Invite ID_user2 to address speaking" and permits the user ID_user2 through an operation instruction), and after the user is permitted (as shown in the accompanying drawing, "ID_user2 may address speaking now" is displayed in the multi-user chat group, which means that ID_user2 has been permitted by the manager), the permitted speaking user (as shown in the accompanying drawing, the user named ID_user2 inputs the words "Alarmist talk") addresses a speaking. In this scenario, the manager has to manage the speaking permission, otherwise, it is likely to have the problems of multiple random speaking users and invalid speaking, thereby affecting the normal progress of the social game.

In this application scenario, in order to realize the fun and fairness of such social game activities, the manager usually does not manually designate a user to address speaking, or determine a fixed speaking sequence in advance (for example, the user knows a late speaking sequence and long waiting time, which may affect the activity of the user to address speaking); However, in the prior art, in a scenario of the multi-user chat room, there is no corresponding technical solution to support the above-described social game activities temporarily, and therefore, at present, a manager has to make manual selection randomly by way of other tools before manual permission, which affects the smoothness, flexibility and fun of carrying out social game activities based on a scenario of the multi-user chat room. The embodiment of the present disclosure provides a speaking user selecting method to solve the above-described problem.

Figure 3:
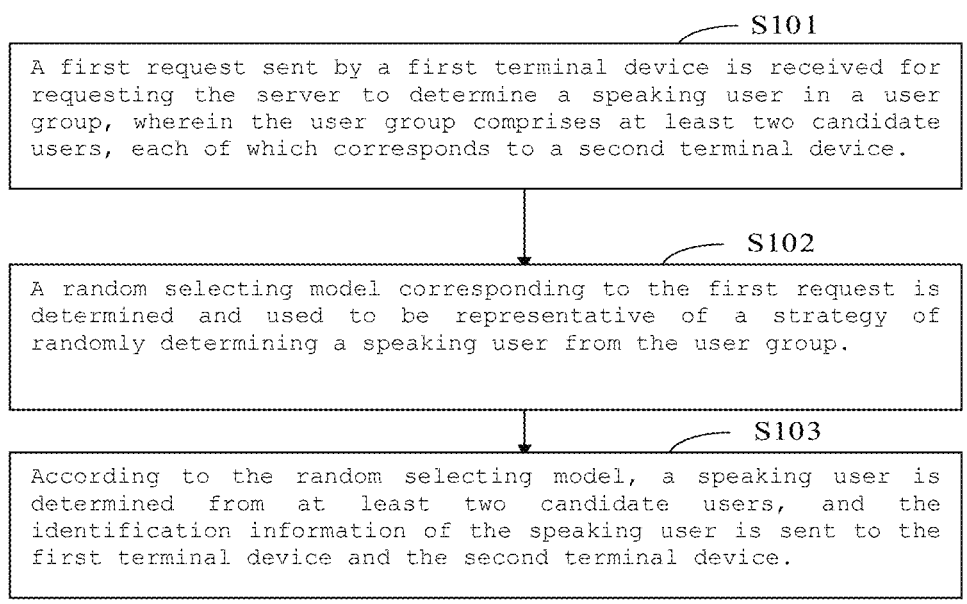
FIG. 3 is a first flowchart of a speaking user selecting method provided by an embodiment of the present disclosure.

FIG. 3 is a first schematic flow view of a speaking user selecting method according to an embodiment of the present disclosure; as shown in FIG. 3, the method of this embodiment may be applied to a server, and the speaking user selecting method comprises:

In step S101, a first request sent by a first terminal device is received for requesting the server to determine a speaking user in a user group, wherein the user group comprises at least two candidate users, each of which corresponds to a second terminal device.

For example, referring to a schematic view of an application scenario shown in FIG. 1, the solution provided in this embodiment is applied to a server, and the server provides, by executing an application program, a virtual multi-user chat room for a terminal device accessing the server, and virtual users entering the multi-user chat room form a chat room group, wherein the first terminal device is a terminal device operated by a user with the management authority of the multi-user chat room, and the second terminal device is a terminal device operated by a general user entering the multi-user chat room. For example, the second terminal device may correspond to a general user of one or more chat rooms.

Further, the user group may be a chat room group composed of all the virtual users in the multi-user chat room, or a subset of the chat room group, that is, the user group comprises some virtual users among all the virtual users. The virtual user comprised in the user group is a candidate user. In the following steps, at least one speaking user will be selected from the candidate user. Wherein, the candidate user is a virtual user in the virtual multi-user chat room, which may be representative of a user identifier or the like.

In one possible implementation, the first request contains a group identifier corresponding to the user group for indicating a group composed of some or all the virtual users in the multi-user chat room; after the first terminal device sends a first request to the server, the server may determine a corresponding user group according to a group identifier in the first request, wherein the user group comprises all or some virtual users in the multi-user chat room, and the virtual user in the user group is a candidate user. Further, when the user group corresponding to the group identifier comprises all the virtual users in the multi-user chat room, the group identifier is a chat room identifier; when the user group corresponding to the group identifier comprises some virtual users in the multi-user chat room, the group identifier is preset in advance, and the group identifier corresponds to a user group consisting of identifiers of a plurality of virtual users, and the identifier of a virtual user contained in the user group corresponding to the group identifier may be set by a second request sent by the first terminal device.

Further, after receiving the first request, the server will make a response to the first request, and determine one or more candidate speaking users as a speaking user from the user group corresponding to the first request based on the information contained in the first request. The processing process of the server based on the first request will be introduced in the following steps, which will not be introduced here.

In step S102, a random selecting model corresponding to the first request is determined and used to be representative of a strategy of randomly determining a speaking user from the user group.

For example, after receiving the first request and making a response, the server will determine a corresponding random selecting model according to the first request, so as to determine a specific random selection strategy. Wherein, for example, the random selecting model comprises a first type of selecting model and a second type of selecting model, wherein the first type of selecting model is used to determine a speaking user from all the candidate users in the user group, and the second type of selecting model is used to determine a speaking user from some candidate users in the user group.

As an example, the first request is the request information sent by a first terminal device operated by a user with the management permission; in this embodiment, the user with the management permission is, for example, a group owner of a chat group, that is, a virtual user who initiates a chat group. After the server makes a response to the first request, according to the characteristics of the user group indicated by the first request, a corresponding random selecting model is selected to randomly select a speaking user, so as to realize the user selecting solution that satisfies the needs of social game activities. For example, when the number of candidate users in the user group corresponding to the first request is less than a first threshold, the first type of selecting model is selected for user selection, that is, a speaking user is selected from all the candidate users in the user group to ensure that all the users may participate in the social game activities; when the number of candidate users in the user group corresponding to the first request is greater than a first threshold, the second type of selecting model is selected for user selection, that is, a speaking user is selected from some candidate users in the user group, for example, a speaking user is selected from the user group composed of a user that is frequently active and a user with a high fan count, so as to improve the overall quality and influence of social game activities and improve the propaganda effect and activity effect of social game activities.

In step S103, according to the random selecting model, a speaking user is determined from at least two candidate users, and the identification information of the speaking user is sent to the first terminal device and the second terminal device.

For example, after determining a random selecting model, based on the selecting model, at least one speaking user is selected from a corresponding user group, and the identification information of the speaking user is sent to the first terminal device and the second terminal device, wherein the identification information of the speaking user is, for example, a user name, an identity and the like of the virtual user. The server sends the identification information of the speaking user to the first terminal device and a plurality of second terminal devices, so that the first terminal device and the second terminal device that receives the identification information of the speaking user display the speaking user on respective interactive interfaces, so that an operating user knows who the next speaking user is.

Alternatively, after determining the speaking user, the server authorizes the speaking permission to a second terminal device corresponding to the speaking user according to the identification information of the speaking user, so that the speaking user may address speaking in the multi-user chat room through the second terminal device. Wherein, according to different application scenarios and the functions of a chat room, the speaking permission may comprise the permission to send a text, voice, image and video, as well as the permission to play real-time voice and video in the chat room, which will not be exemplified one by one here.

Figure 4:
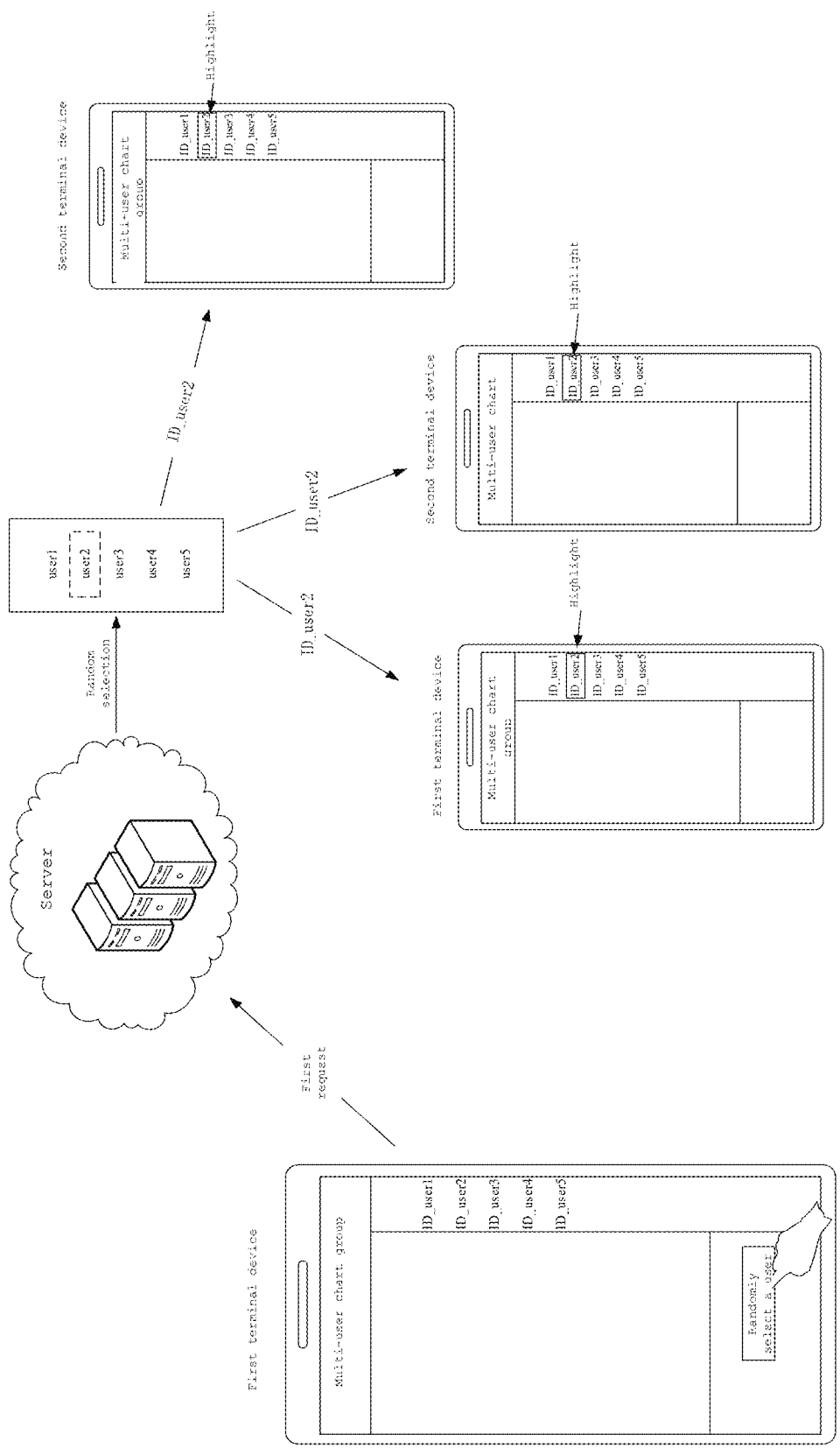
FIG. 4 is a schematic view of a process of determining a speaking user and informing each terminal device provided by an embodiment of the present disclosure.

FIG. 4 is a schematic view of a process of determining a speaking user and informing each terminal device according to an embodiment of the present disclosure; as shown in FIG. 4, the first terminal device displays a multi-user interactive interface through a touch screen; as an example, the multi-user interactive interface is a multi-user chat group interface, in which there are a plurality of virtual users, comprising user_1 corresponding to the first terminal device, and user_2 to user_5 corresponding to a plurality of second terminal devices. The interface of the multi-user chat group is provided with an interaction component of "randomly selecting a user"; when a user on a side of the first terminal device clicks the interaction component through the touch screen, the first terminal device sends a first request to the server, and the server randomly selects a speaking user (user_2) from all the virtual users (user_2 to user_5) of the multi-user chat group according to the first request, and the identification information of the speaking user (ID_user2 as shown in the accompanying drawing) is synchronized to the first terminal device and the second terminal device, so that the user name (ID_user2) of the speaking user (user_2) is highlighted on the multi-user chat group interface of each terminal device, and the speaking user obtains a speaking permission and sends the voice information (not shown in the accompanying drawing) in the multi-user chat group. The automatic random selection and the speaking permission of a user in the multi-user chat group are realized.

In this embodiment, by receiving a first request sent by a first terminal device, the first request is used to request the server to determine a speaking user in a user group, wherein the user group comprises at least two candidate users, each of which corresponds to a second terminal device; determine a random selecting model corresponding to the first request, wherein the random selecting model is used to be representative of a strategy of randomly determining the speaking user from the user group; and determine a speaking user from at least two candidate users according to the random selecting model, and send the identification information of the speaking user to the first terminal device and the second terminal device. After the first terminal sends a first request for determining a speaking user in the user group to the server, the server will automatically determine a corresponding random selecting model, and automatically select a speaking user based on the random selecting model, thus, in this process, the manager does not have to manually select a speaking user, so that in a specific scenario of social activities, it is possible to improve the smoothness and fun during the process of carrying out social activities based on a multi-user chat group, and expand a flexible and diversified implementation of social activities.

Figure 5:
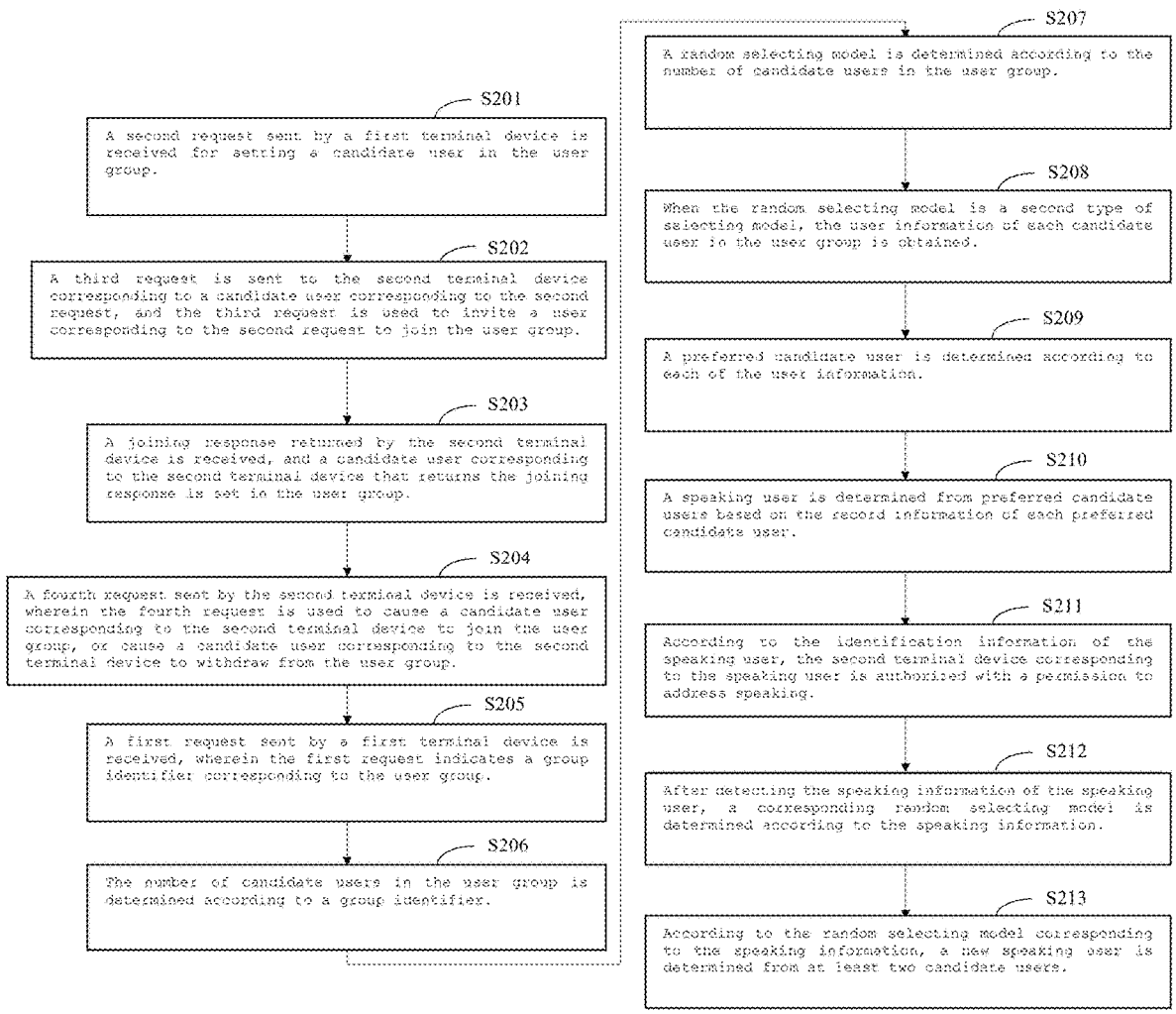
FIG. 5 is a second flowchart of a speaking user selecting method provided by an embodiment of the present disclosure.

FIG. 5 is a second flowchart of a speaking user selecting method provided by an embodiment of the present disclosure. Based on the embodiment shown in FIG. 3, this embodiment describes in detail the process of determining a candidate user before step S101 and the process of continuously determining a speaking user after S103, and further refines the process of determining a random selecting model; the speaking user selecting method comprises:

In step S201, a second request sent by a first terminal device is received for setting a candidate user in the user group.

In step S202, a third request is sent to the second terminal device corresponding to a candidate user corresponding to the second request, and the third request is used to invite a user corresponding to the second request to join the user group.

In step S203, a joining response returned by the second terminal device is received, and a candidate user corresponding to the second terminal device that returns the joining response is set in the user group.

Figure 6:
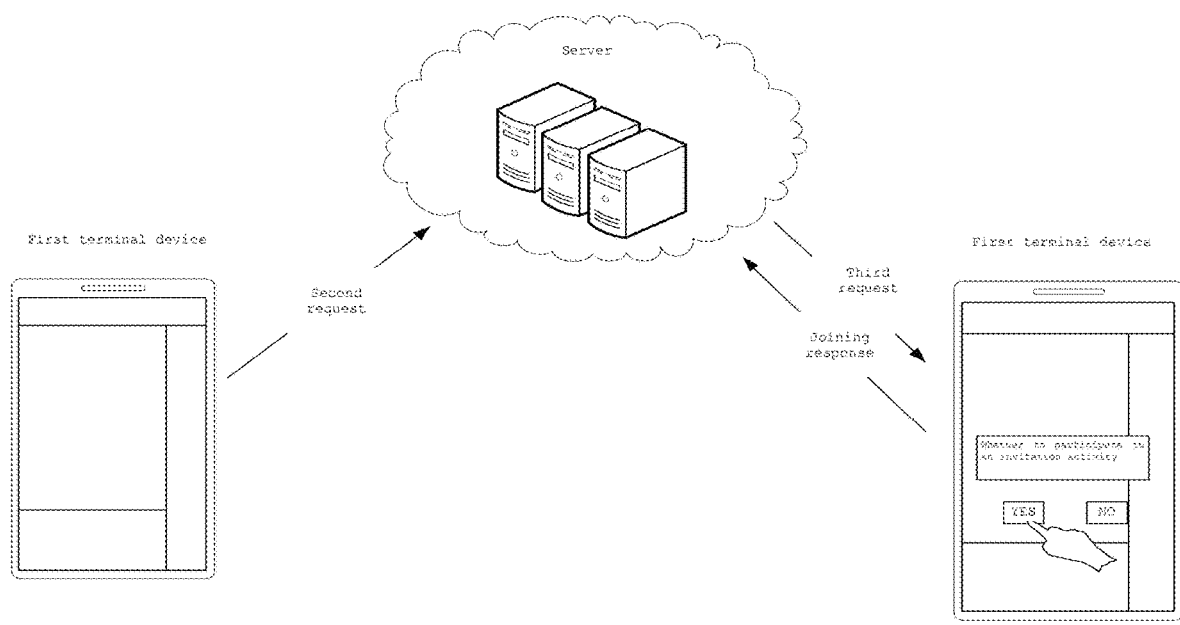
FIG. 6 is a schematic view of a process of sending an activity invitation to a second terminal device provided by an embodiment of the present disclosure.

As an example, the second request sent by the first terminal device is the request information for requesting a user in the current multi-user chat room to join the user group for randomly selecting a speaking user, that is, as an example, the group owner on the first terminal device side initiates an activity invitation for social game activities to a general group member in the chat group, and a group member on the second terminal device side who receives a demand joins the user group and participates in subsequent social game activities. FIG. 6 is a schematic view of a process of sending an activity invitation to a second terminal device provided by an embodiment of the present disclosure. As shown in FIG. 6, the first terminal device side sends a second request containing a user identifier to the server, and the server sends a third request to the second terminal device corresponding to each user identifier respectively according to the user identifier contained in the second request, so as to demand a virtual user corresponding to the second terminal device to join the user group, and after receiving the third request, the second terminal device will display the prompt information in the multi-user interactive to prompt the user in operation. Specifically, referring to FIG. 6, the prompt information in the accompanying drawing is "whether to participate in the invitation activity", which correspondingly comprises a "Yes" option and a "No" option; based on an operation of the user on the second terminal device side (for example, as shown in the accompanying drawing, clicking the "Yes" option), each second terminal device will return a response message, which comprises a joining response or a refusing response, and when the second terminal device returns a joining response to the server, a virtual user corresponding to the second terminal device will join the user group; and when the second terminal device returns a rejecting response to the server (not shown in the accompanying drawing), the virtual user corresponding to the second terminal device will not join the user group. In this embodiment, a candidate user in the user group is set by way of the request information (a second request) sent by the first terminal device and the response information (a joining response) returned by the second terminal device, so that the users who enter the user group to participate in subsequent social game activities are all the users that is frequently active in involvement, thereby improving the user involvement and activity effect of social game activities and avoiding the disturbance of a user in the group that is not frequently active.

In step S204, a fourth request sent by the second terminal device is received, wherein the fourth request is used to cause a candidate user corresponding to the second terminal device to join the user group, or cause a candidate user corresponding to the second terminal device to withdraw from the user group.

As an example, on the second terminal device side, through the operation of the user, the user may positively join or withdraw from the process of random selection of the speaking user. Specifically, after receiving a user operation, the second terminal device sends a fourth request to the server, so as to demand a virtual user corresponding to the second terminal device to join the user group or withdraw from the user group. Alternatively, when the fourth request is used to request joining the user group, the server detects an activity state of the social game activities, and adds a virtual user corresponding to the fourth request to the user group when the activity state satisfies the requirements.

In this embodiment, the purpose of positively joining or withdrawing from the user group by the second terminal device side is realized by way of the request information (a fourth request) sent by the second terminal device, so that the user in the group may join or withdraw from the social game activities based on the chat group more flexibly, thereby improving the convenience of the user during the operation process.

In step S205, a first request sent by a first terminal device is received, wherein the first request indicates a group identifier corresponding to the user group.

In step S206, the number of candidate users in the user group is determined according to a group identifier.

In step S207, a random selecting model is determined according to the number of candidate users in the user group.

In this embodiment, the steps S201-S204 are a process of determining a candidate user in the user group; for example, after the above-described steps S201-S204, the server will generate a mapping relationship between the game activities initiated by the first terminal device and the user group, and after receiving a first request sent by a first terminal device, the server determines a group identifier of a corresponding user group according to the mapping relationship, so as to determine the user group and candidate users in the user group. Further, a corresponding random selecting model is selected according to the number of candidate users; as an example, if the number of candidate users is less than a first threshold, for example, 100, a random selecting model is determined as a first type of selecting model, that is, a speaking user is determined from all the candidate users in the user group; when the number of candidate users is more than 100, a random selecting model is determined as a second type of selecting model, that is, a speaking user is determined from some candidate users in the user group.

In step S208, when the random selecting model is a second type of selecting model, the user information of each candidate user in the user group is obtained.

In step S209, a preferred candidate user is determined according to each of the user information.

Further, the second type of selecting model comprises a plurality of model input parameters for controlling an implementation of the second type of selecting model of determining some candidate users and randomly selecting a speaking user. When the random selecting model is a second type of selecting model, in order to avoid excessive candidate users which lead to a rising randomness and affect the activity effect of social game activities, it is necessary to select some preferred candidate users from all the candidate user, and determine a speaking user by secondary screening based on a preferred candidate user, thereby improving the user quality of the speaking user and improving the activity effect of social game activities.

Figure 7:
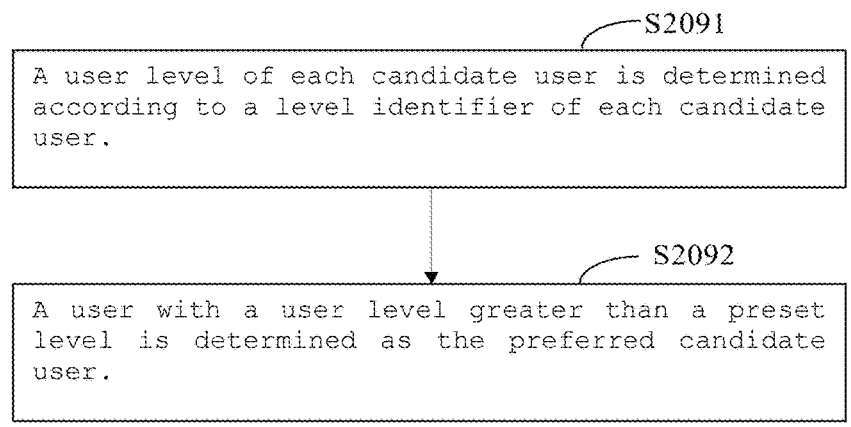
FIG. 7 is a flowchart of the implementation steps of step S209 in an embodiment shown in FIG. 5.

In one possible implementation, the user information comprises a level identifier representative of a user level of a candidate user; as shown in FIG. 7, the step S209 comprises two specific implementation steps, i.e. step S2091 and step S2092:

In step S2091, a user level of each candidate user is determined according to a level identifier of each candidate user.

In step S2092, a user with a user level greater than a preset level is determined as the preferred candidate user.

As an example, the level identifier is the information for distinguishing a user level, such as a level, bonus and rank of a user, and the level identifier of the user may be generated by factors such as the times, scores, evaluation information or fan count of the user participating in such social game activities based on a multi-user chat room; therefore, the user with a high user level is usually a user with frequent times of participating in such activities and an excellent score, and thus with a high user quality, and therefore, a user with a user level higher than a preset level is determined as a preferred candidate user, which can improve the activity effect of such social game activities, reduce the problems of poor coherence and poor activity effect resulting from new users who are unfamiliar with the game rules and the operation methods, and at the same time improve the propaganda effect and viewing effect of the activities.

In step S210, a speaking user is determined from preferred candidate users based on the record information of each preferred candidate user.

Further, after determining preferred candidate users, in one possible implementation, a user may be randomly selected directly from preferred candidate users as a speaking user. In another possible implementation, the user information comprises the record information representative of a speaking record of a candidate user in the user group. According to a speaking record, it is possible to determine whether a corresponding user addresses a speaking in the group. In this embodiment, after determining a preferred candidate user, a non-speaking user who has not addressed a speaking is screened for three times from each preferred candidate user, and one or more speaking user is randomly selected and determined from non-speaking users, thereby improving the overall involvement of the user.

Figure 8:
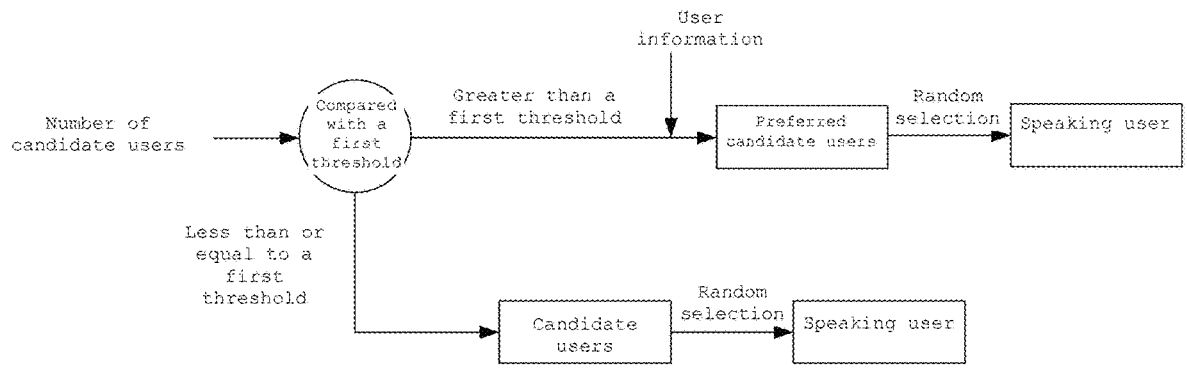
FIG. 8 is a schematic view of a process of determining a speaking user provided by an embodiment of the present disclosure.

FIG. 8 is a schematic view of a process of determining a speaking user provided by an embodiment of the present disclosure; as shown in FIG. 8, first of all, after obtaining the number of candidate users in the user group, comparing it with a first threshold; when the number of candidate users is greater than a first threshold, a preferred candidate user is determined based on the user information of each candidate user in the user group; then, a non-speaking user therein is determined based on the record information of each preferred candidate user; finally, a speaking user is randomly selected and determined from each non-speaking user.

It is to be noted that, in this embodiment, step S209 and step S210 are to make second and third screen on the user group according to the user information of a candidate user respectively (S209 is according to a level identifier in the user information and S210 is according to the record information in the user information), thereby reducing the number of candidate users and improving the speaking quality and user involvement of the user. Therefore, steps S209 and S210 may be used alone or used at the same time. Moreover, when used at the same time, the performing sequence of steps S209 and S210 may be exchanged as needed.

In this embodiment, before randomly selecting a candidate user, the candidate user is screened for multiple times according to the user information, thereby reducing the speaking randomness of the user, improving the speaking quality and the user involvement of the user, and improving the overall effect of social game activities in the case of a large number of candidate users.

For example, in one possible implementation, the user group comprises at least a first group and a second group, and after determining the speaking user, the method of this embodiment further comprises: allocating the speaking user to the first group or the second group, and sending an allocation result to the first terminal device and the second terminal device. In this embodiment, after determining the speaking user, the speaking user may be grouped based on the identification information of the speaking user, thereby achieving the effect of random grouping, so as to satisfy the process of randomly grouping and selecting the user in a specific application scenario of random grouping.

In step S211, according to the identification information of the speaking user, the second terminal device corresponding to the speaking user is authorized with a permission to address speaking.

In step S212, after detecting the speaking information of the speaking user, a corresponding random selecting model is determined according to the speaking information.

In step S213, according to the random selecting model corresponding to the speaking information, a new speaking user is determined from at least two candidate users.

For example, after determining the speaking user, the second terminal device of the speaking user is authorized with a permission to address speaking based on the identification information of the speaking user, so that the second terminal device may send a text, voice, video and the like in the chat group.

In one specific application scenario, in social game activities, the speaking of a previous user may affect a subsequent speaking user. For example, in a "script-category" social game, a previous speaking user may designate several users to address speaking, and at this time, according to the speaking information of the previous speaking user, one of the several candidate users designated by the previous speaking user is randomly selected as a speaking user to address speaking. In the prior art, this step usually may only be realized by manual allocation and permission by the "manager".

As an example, in this embodiment, the second type of selecting model comprises a plurality of model input parameters for controlling the second type of selecting model to determine some candidate users, and randomly select an implementation of randomly selecting a speaking user. For example, the model input parameters comprise a user identifier, and after the speaking information of the speaking user is detected, a corresponding user identifier is determined according to the speaking information, and the user identifier serves as a model input parameter to determine a corresponding random selecting model, thereby achieving the purpose that the random selecting model performs random selection from several designated candidate users.

FIG. 9 is a schematic view of a process of continuous random speaking based on the speaking information provided by an embodiment of the present disclosure; as shown in FIG. 9, after the second terminal device corresponding to the speaking user is authorized with the speaking permission, the speaking user may address speaking in the multi-user chat room through the second terminal device. After the server detects the speaking information corresponding to the second terminal device, the user identifications (shown as the user identification A, the user identification B and the user identification C in the accompanying drawing) of several candidate users who need to address speaking in a subsequent speaking link are determined based on the processing of the speaking information, and the above-described user identification serves as a model input parameter to determine a second type of selecting model, and based on the second type of selecting model, a speaking user is randomly selected from a candidate user corresponding to the user identification A, the user identification B and the user identification C (shown as the user identification B in the accompanying drawing, the user identification B corresponds to user2, and its user name is referred to as ID_user2). As an example, thereinafter, S211-S213 are performed repeatedly, that is, the speaking user is permitted, and based on the permission of the speaking user, a new speaking user is determined in a loop until an end instruction is triggered, so as to complete continuous random speaking of multiple users. Wherein, the process of processing the speaking information and determining a user identifier may be realized based on the recognition and classification technology of text, voice and image, which will not be specifically introduced here.

In this embodiment, by analyzing the speaking information of the speaking user, and based on an analysis results, a new random selecting model is determined for continuous speaking user selection, so as to realize continuous speaking without interference between multiple speaking users in a scenario of social game activities, thereby improving the smoothness, flexibility and expansibility during the process of carrying out social game activities based on a multi-user chat room.

FIG. 10 is a third flowchart of a speaking user selecting method provided by an embodiment of the present disclosure; the method of this embodiment may be applied to a first terminal device, and as shown in FIG. 10, the speaking user selecting method provided by this embodiment comprises:

In step S301, a first request is sent to the server for requesting the server to determine a speaking user in a user group, wherein the user group comprises at least two candidate users, each of which corresponds to a second terminal device.

In step S302, the identification information sent by the server is received, and the identification information is used to indicate a speaking user.

In step S303, a user identifier of the speaking user is highlighted in the multi-user interactive interface according to the identification information.

As an example, the first terminal device is a terminal device operated by a user with the management permission of the multi-user chat room, and the second terminal device is a terminal device operated by a general user who enters the multi-user chat room. After the first terminal device sends a first request to the server, it is possible to cause the server to determine a corresponding user group according to a group identifier corresponding to the first request, the user group comprising all or some virtual users in the multi-user chat room, and the virtual user in the user group is a candidate user.

Further, after receiving the first request, the server may randomly select a candidate user in the user group based on the first request, determine one or more speaking users, and authorize a speaking permission to the speaking user, so that the speaking user may address speaking in the group. At the same time, the identification information for indicating a speaking user is sent to the first terminal device and the second terminal device, so that the first terminal device and the second terminal device may obtain a result of randomly selecting a speaking user. The specific implementation process of the above-described steps has been introduced in the embodiments shown in FIGS. 3 to 9, which will not be described in detail here.

As an example, the first terminal device displays a multi-user interactive interface, which may be realized based on APP operating in the first terminal device, and the display and interaction of the multi-user chat room may be realized through the multi-user interactive interface. After receiving the identification information, the first terminal device highlights a user identifier of the speaking user based on the multi-user interactive interface, so that an operator of the first terminal device may acknowledge the identity of the speaking user. Wherein, the user identifier of the speaking user is, for example, a user name, a user avatar and the like, and the highlighting is implemented by, for example, highlight display, chromic display or displaying a user identifier in a specific area or the like, so as to show a speaking user. Similarly, after receiving the identification information, the second terminal device will display a user identifier of the speaking user by similar steps, so that an operator of the second terminal device may acknowledge the identity of the speaking user, which will not be described in detail here.

Figure 11:
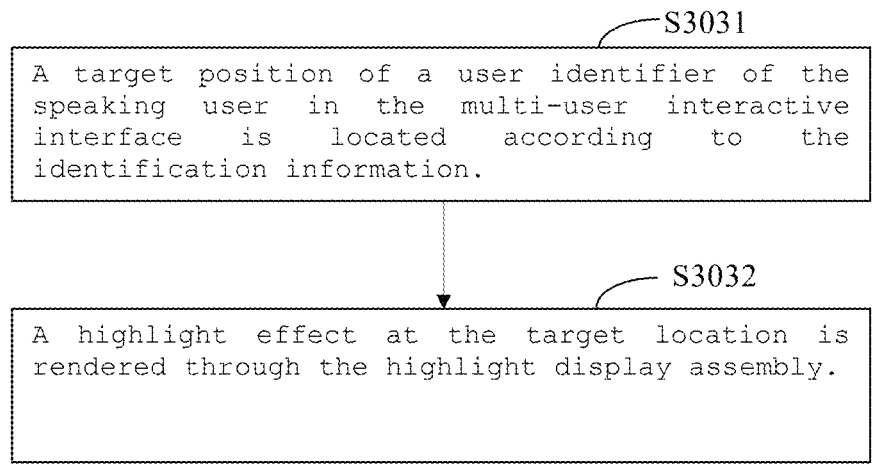
FIG. 11 is a flowchart of the implementation steps of step S303 in an embodiment shown in FIG. 10.

In one possible implementation, the multi-user interactive interface comprises a highlight display assembly. As shown in FIG. 11, the step S303 comprises two specific implementation steps, i.e. step S3031 and step S3032:

In step S3031, a target position of a user identifier of the speaking user in the multi-user interactive interface is located according to the identification information.

In step S3032, a highlight effect at the target location is rendered through the highlight display assembly.

Figure 12:
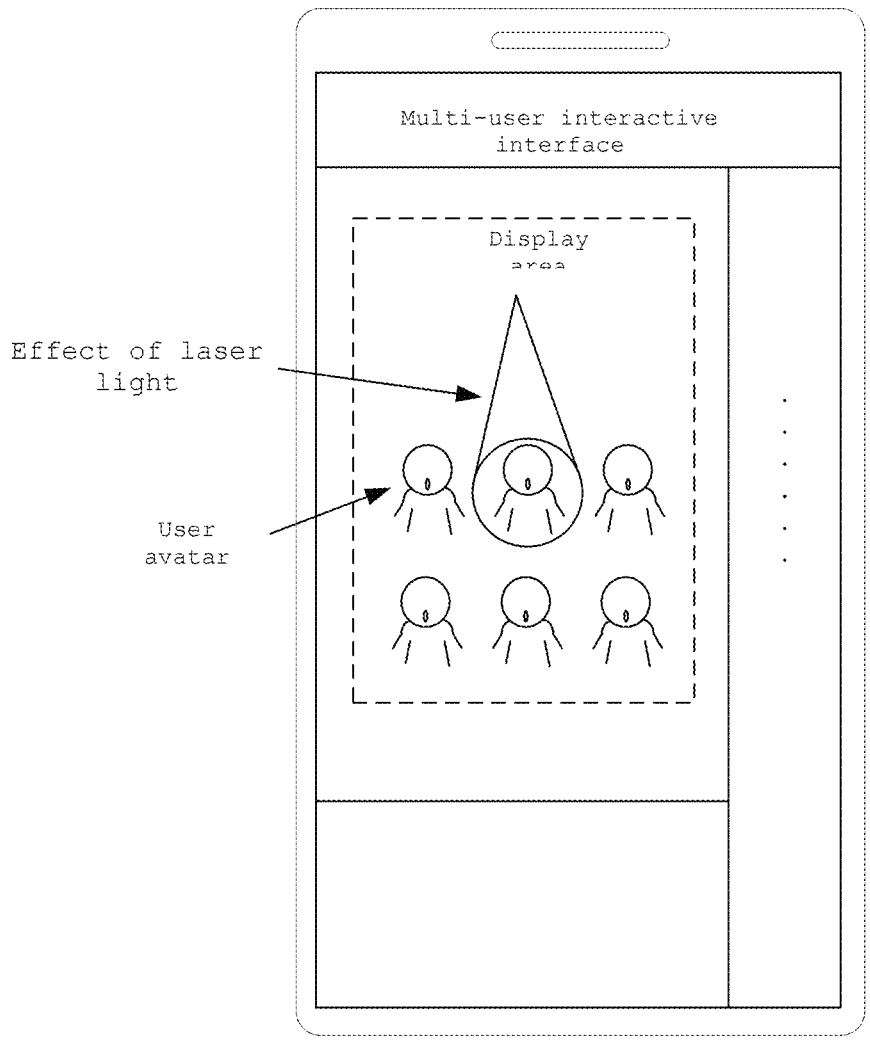
FIG. 12 is a schematic view of a multi-user interactive interface provided by an embodiment of the present disclosure.

As an example, FIG. 12 is a schematic view of a multi-user interactive interface provided by an embodiment of the present disclosure; as shown in FIG. 12, the multi-user interactive interface comprises a display area for displaying a user identifier of the speaking user, and as an example, the display area may be located in the center of the multi-user interactive interface. Wherein, the user identifier is, for example, a user avatar, and each user identifier corresponds to an identifier position, and after a user identifier is determined according to the identification information, a corresponding identifier position may be determined. Further, for example, a highlight effect (shown as an effect of a laser light in the accompanying drawing) is rendered at the identifier position through the highlight display assembly in APP, so as to realize the highlight display of the user identifier of the speaking user. In this embodiment, by rendering the speaking user with a highlight effect, it is possible to realize a better demonstration effect for the speaking user, thereby improving the visual representability of social game activities. The highlighting effect provided by this embodiment is an implementation of highlight display, and other implementations of highlight display may also be realized in similar forms, for example, rendering a color effect and a photo frame effect at an identifier position, which will not be exemplarily described one by one here.

In one possible implementation, it is a dynamic implementation process to highlight a user identifier of the speaking user in the multi-user interactive interface according to the identification information. For example, before highlighting a user identifier of the speaking user in a multi-user interactive interface, the method further comprises the steps of: sequentially selecting at least one candidate user based on a preset rule, and highlighting a user identifier of the selected candidate user in the multi-user interactive interface, wherein the effect of highlighting a user identifier of each selected candidate user is maintained for a first duration.

As an example, referring to a schematic view of the multi-user interactive interface shown in FIG. 12, before a user identifier of a finally determined speaking user is highlighted in the multi-user interactive interface, in the interactive interface, other candidate users are sequentially rendered by an effect of a laser light, temporarily staying for a first duration, thereby demonstrating a dynamic process of selecting a speaking user and further improving the visual representability.

Further, the realization process of sequentially selecting at least one candidate user based on a preset rule and highlighting a user identifier of the selected candidate user in the multi-user interactive interface comprises: randomly selecting a candidate user in the user group in a loop based on a pseudo-random number, and highlighting a user identifier of each selected candidate user during a loop process in the multi-user interactive interface.

Further, the multi-user interactive interface comprises a random display area, and in another possible implementation, the sequentially selecting at least one candidate user based on a preset rule and highlighting a user identifier of the selected candidate user in the multi-user interactive interface comprises: randomly selecting a candidate user in the user group in a loop based on a pseudo-random number, and displaying a user identifier of each selected candidate user during the loop process in the random selecting area. Specifically, the multi-user interactive interface comprises a random display area, in which a user selected in each cycle is displayed; when there are excessive candidate users, demonstrating a dynamic process of selecting a speaking user is provided to the random selecting area, thereby improving the visual representability.

Alternatively, before step S301, the method further comprises:

In step S3001, a first user instruction input through the multi-user interactive interface is received, wherein the first user instruction is used to add or delete a candidate user in the user group.

In step S3002, a second request is sent to the server according to the first user instruction, wherein the second request is used to set a candidate user in the user group.

As an example, before the first terminal device sends a first request to the server for requesting the server to randomly select a candidate user in the user group, the first terminal device may also send a second request to the server to realize adjustment operations such as adding and deleting a candidate user in the user group. Specifically, the first terminal device receives a first user instruction input through the multi-user interactive interface; as an example, the first user instruction may be a user selection instruction of a user selecting joining a social game activity, or a kick-out instruction to delete a user from a currently selected candidate user. The adjustment of a candidate user in the current user group may be realized by way of the second request generated by the first user instruction. Wherein, the process that the server completes the adjustment of a candidate user in the user group based on the second request has been introduced in the embodiments shown in FIGS. 3 to 9, which will not be described in detail here.

In this embodiment, by sending a first request to the server, the first request is used to request the server to determine a speaking user in a user group, wherein the user group comprises at least two candidate users, each of which corresponds to a second terminal device; receive the identification information sent by a server, wherein the identification information is used to indicate a speaking user; and highlight a user identifier of the speaking user in the multi-user interactive interface according to the identification information. After the first terminal sends a first request for determining a speaking user in the user group to the server, the server will automatically determine a corresponding random selecting model, and automatically select a speaking user based on the random selecting model, thus, in this process, the manager does not have to manually select a speaking user, so that in a specific scenario of social activities, it is possible to improve the smoothness and fun during the process of carrying out social activities based on a multi-user chat group and expand a flexible and diversified implementation of social activities.

In one possible implementation, the speaking user comprises a first speaking user, and in step S303, a user identifier of the first speaking user is highlighted in the multi-user interactive interface. After step S303, there further comprises:

In step S304, the first speaking information input by the speaking user is displayed, wherein the first speaking information is used to determine a corresponding random selecting model, and the random selecting model corresponding to the first speaking information is used to be representative of a strategy of randomly determining a new speaking user from the user group.

In step S305, a user identifier of the second speaking user is highlighted in the multi-user interactive interface, and the second speaking user is determined by a random selecting model corresponding to the first speaking information.

In step S306, the second speaking information input by the second speaking user is displayed.

As an example, after a user identifier of the first speaking user is highlighted on the first terminal device (at the same time on the second terminal device) side, the first speaking user is authorized to address speaking, and afterwards, the first speaking user inputs the first speaking information, and the first terminal device synchronously displays the first speaking information. At the same time, the first speaking information is used to determine a corresponding random selecting model on the server side, so as to randomly select a speaking user in a specific user group, that is, a second speaking user. According to a response of the server, the first terminal device displays a user identifier of the second speaking user, for example, a user avatar, in a highlighted manner, wherein the second speaking user is determined by the random selecting model determined by the first speaking information, that is, with the change of the first speaking information, the displayed user identifier of the second speaking user also changes, thereby realizing the effect of continuous random speaking. For a detailed implementation process, reference may be made to a corresponding introduction of the embodiment shown in FIG. 9, which will not be described in detail here.

Figure 13:
FIG. 13 is a signaling view of a speaking user selecting method provided by an embodiment of the present disclosure.

In order to better explain an implementation process of the speaking user selecting method provided by this embodiment, a more specific embodiment will be described below. FIG. 13 is a signaling view of a speaking user selecting method provided by an embodiment of the present disclosure; as shown in FIG. 13, the speaking user selecting method provided by this embodiment comprises:

In S401, the first terminal device sends a second request to the server.

In S402, the server sends a third request to the second terminal device corresponding to a candidate user corresponding to the second request.

In S403, the second terminal device returns a joining response.

In S404, the server receives a joining response returned by the second terminal device, and sets a candidate user corresponding to the second terminal device that returns the joining response in the user group.

In S405, the second terminal device sends a fourth request to the server.

In S406, the server deletes a candidate user corresponding to the second terminal device from the user group according to the fourth request.

In S407, the first terminal device sends a first request to the server.

In S408, the server receives the first request and determines the number of candidate users in the user group corresponding to the first request.

In S409, when the number of candidate users is less than a first threshold, the server uses the first type of selecting model to randomly select all the candidate users in all the user groups so as to determine a speaking user.

In S410, when the number of candidate users is greater than or equal to the first threshold, the server obtains the user information of each candidate user in the user group.

In S411, the server determines the second type of selecting model according to the user information.

In S412, the server determines a preferred candidate user based on the second type of selecting model, and randomly selects a preferred candidate user to determine a speaking user.

In S413, the server authorizes a speaking permission to a second terminal device corresponding to the speaking user according to the identification information of the speaking user.

In S414, the server sends the identification information of the speaking user to the first terminal device and the second terminal device.

In S415, the first terminal device receives the identification information sent by the server, and highlights a user identifier of the speaking user in the multi-user interactive interface according to the identification information.

In S416, the second terminal device receives the identification information sent by the server, and highlights a user identifier of the speaking user in the multi-user interactive interface according to the identification information.

In S417, the second terminal device sends the speaking information to the server.

In S418, after detecting the speaking information of the speaking user, the server determines a corresponding random selecting model according to the speaking information.

In S419, the server determines a new speaking user from at least two candidate users according to the random selecting model corresponding to the speaking information.

In S420, return to step S413 until a stop condition is triggered.

The implementation method of each step in this embodiment has been described in detail in the previous embodiments, which will not be described in detail here; specifically, reference may be made to a description of the embodiments corresponding to FIGS. 3 to 12.

Figure 14:
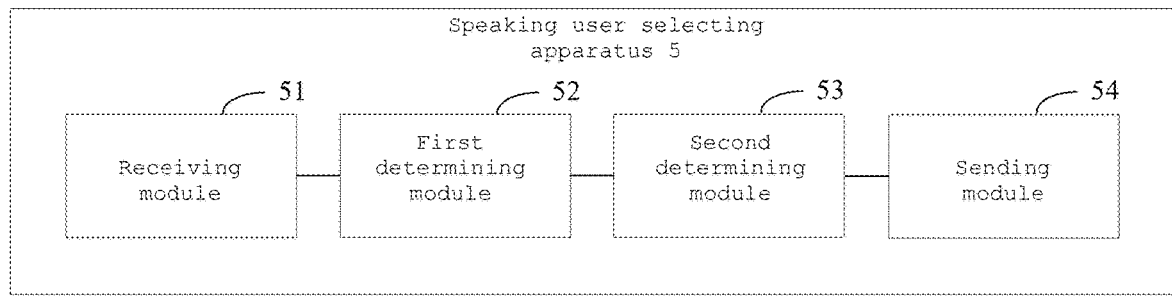
FIG. 14 is a structural block view of a speaking user selecting apparatus provided by an embodiment of the present disclosure.

Corresponding to the speaking user selecting method of the embodiment above, FIG. 14 is a structural block view of a speaking user selecting apparatus provided by an embodiment of the present disclosure; the speaking user selecting apparatus 5 provided by this embodiment is applied to a server, and only the part related to the embodiment of the present disclosure is shown for convenient explanation. Referring to FIG. 14, the speaking user selecting apparatus 5 provided in this embodiment comprises:

a receiving module 51 configured to receive a first request sent by a first terminal device for requesting a server to determine a speaking user in a user group, wherein the user group comprises at least two candidate users, each of which corresponds to a second terminal device;

a first determining module 52 configured to determine a random selecting model corresponding to the first request, wherein the random selecting model is used to be representative of a strategy of randomly determining the speaking user from the user group;

a second determining module 53 configured to determine a speaking user from at least two candidate users according to a random selecting model; and a sending module 54 configured to send the identification information of the speaking user to the first terminal device and the second terminal device.

In one embodiment of the present disclosure, the first request comprises a group identifier corresponding to the user group;

The first determining module 52 is specifically configured to: determine the number of candidate users in the user group according to the group identifier; and determine the random selecting model according to the number of candidate users in the user group.

In one embodiment of the present disclosure, when determining a random selecting model according to the number of candidate users in the user group, the first determining module 52 is specifically configured such that: when the number of candidate users in the user group is less than a first threshold, the random selecting model is a first type of selecting model configured to determine a speaking user from all the candidate users in the user group; and when the number of candidate users in the user group is greater than a first threshold, the random selecting model is a second type of selecting model configured to determine a speaking user from some candidate users in the user group.

In one embodiment of the present disclosure, the first determining module 52 is further configured to: determine a corresponding random selecting model according to the speaking information after detecting the speaking information of the speaking user; and the second determining module 53 is further configured to determine a new speaking user from at least two candidate users according to the random selecting model corresponding to the speaking information.

In one embodiment of the present disclosure, the second determining module 53 is specifically configured to: obtain the user information of each candidate user in the user group; determine a preferred candidate user according to each of the user information; and determine a speaking user from preferred candidate users according to the random selecting model.

In one embodiment of the present disclosure, the user information comprises a level identifier used to be representative of a user level of a candidate user; and when determining a preferred candidate user according to each of the user information, the second determining module 53 is specifically configured to: determine the preferred candidate user according to a level identifier of each candidate user.

In one embodiment of the present disclosure, the user information comprises the record information used to be representative of a speaking record of a candidate user in the user group; and when determining a preferred candidate user according to each of the user information, the second determining module 53 is specifically configured to determine a preferred candidate user according to the record information of each candidate user.

In one embodiment of the present disclosure, before receiving a first request sent by a first terminal device, the receiving module 51 is further configured to receive a second request sent by the first terminal device, wherein the second request is used to set a candidate user in the user group.

In one embodiment of the present disclosure, after receiving the second request, the sending module 54 is further configured to send a third request to the second terminal device corresponding to a candidate user corresponding to the second request, and the third request is used to invite a user corresponding to the second request to join the user group; and the receiving module 51 is also configured to: receive a joining response returned by the second terminal device, and set a candidate user corresponding to the second terminal device that returns the joining response in the user group.

In one embodiment of the present disclosure, the receiving module 51 is further configured to: receive a fourth request sent by the second terminal device, wherein the fourth request is used to cause a candidate user corresponding to the second terminal device to join the user group, or to cause a candidate user corresponding to the second terminal device to withdraw from the user group.

In one embodiment of the present disclosure, after determining the speaking user, the second determining module 53 is further configured to: authorize a speaking permission to a second terminal device corresponding to the speaking user according to the identification information of the speaking user.

In one embodiment of the present disclosure, the user group comprises at least a first group and a second group, and after determining the speaking user, the second determining module 53 is further configured to: allocate the speaking user to the first group or the second group; and the sending module 54 is also configured to: send an allocation result to the first terminal device and the second terminal device.

The receiving module 51, the first determining module 52, the second determining module 53 and the sending module 54 are connected sequentially. The speaking user selecting apparatus 5 provided in this embodiment may perform the technical solution performed by the server in the above-described method embodiment, with similar implementation principles and technical effects, which will not be described in detail in this embodiment here.

Figure 15:
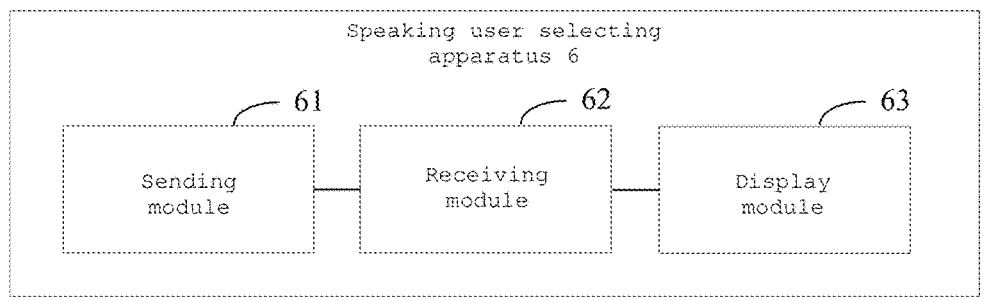
FIG. 15 is a structural block view of another speaking user selecting apparatus provided by an embodiment of the present disclosure.

FIG. 15 is a structural block view of another speaking user selecting apparatus provided by an embodiment of the present disclosure; the speaking user selecting apparatus 6 provided by this embodiment may be applied to the first terminal device, and only the part related to the embodiment of the present disclosure is shown for convenient explanation. Referring to FIG. 15, the speaking user selecting apparatus 6 provided in this embodiment comprises:

a sending module 61 configured to send a first request to the server, wherein the first request is used to request the server to determine a speaking user in a user group, wherein the user group comprises at least two candidate users, each of which corresponds to a second terminal device;

a receiving module 62 configured to receive the identification information sent by the server, wherein the identification information is used to indicate a speaking user; and a display module 63 configured to highlight a user identifier of the speaking user in the multi-user interactive interface according to the identification information.

In one embodiment of the present disclosure, the multi-user interactive interface comprises a highlight display assembly; and the display module 63 is specifically configured to locate a target position of a user identifier of the speaking user in the multi-user interactive interface according to the identification information; and render a highlight effect at the target location through the highlight display assembly.

According to one or more embodiments of the present disclosure, before highlighting a user identifier of the speaking user in a multi-user interactive interface, the display module 63 is further configured to: sequentially select at least one candidate user based on a preset rule, and highlight a user identifier of the selected candidate user in the multi-user interactive interface, wherein the effect of highlighting a user identifier of each selected candidate user is maintained for a first duration.

According to one or more embodiments of the present disclosure, when sequentially selecting at least one candidate user based on a preset rule, and highlighting a user identifier of the selected candidate user in the multi-user interactive interface, the display module 63 is specifically configured to: randomly select a candidate user in the user group based on a pseudo-random number, and highlight a user identifier of each selected candidate user during a loop process in the multi-user interactive interface.

According to one or more embodiments of the present disclosure, the multi-user interactive interface comprises a random display area, and when sequentially selecting at least one candidate user based on a preset rule, and highlighting a user identifier of the selected candidate user in the multi-user interactive interface, the display module 63 is specifically configured to: randomly select a candidate user in the user group based on a pseudo-random number, and display a user identifier of each selected candidate user during a loop process in the random selecting area.

In one embodiment of the present disclosure, the receiving module 62 is further configured to: receive a first user instruction input through the multi-user interactive interface, wherein the first user instruction is used to add or delete a candidate user in the user group; and the sending module 61 is also configured to: send a second request to a server according to the first user instruction, wherein the second request is used to set a candidate user in the user group.

In one embodiment of the present disclosure, the first request comprises a group identifier corresponding to the user group, and the group identifier is configured to instruct the server to determine a random selecting model used to be representative of a strategy of randomly determining the speaking user from the user group.

In one embodiment of the present disclosure, the speaking user comprises a first speaking user, and after highlighting a user identifier of the speaking user in a multi-user interactive interface, the display module 63 is further configured to: display the first speaking information input by the first speaking user; wherein the first speaking information is used to determine a corresponding random selecting model, and the random selecting model corresponding to the first speaking information is used to be representative of a strategy of randomly determining a new speaking user from the user group.

In one embodiment of the present disclosure, after the first speaking information is sent to the server, the display module 63 is further configured to: highlight a user identifier of a second speaking user in the multi-user interactive interface, wherein the second speaking user is determined by a random selecting model corresponding to the first speaking information; and display the second speaking information input by the second speaking user.

Figure 16:
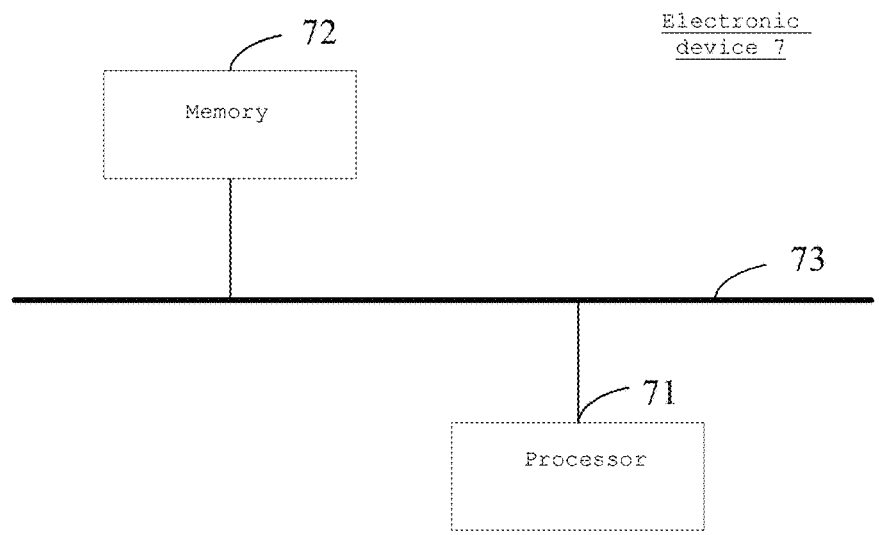
FIG. 16 is a schematic structural view of an electronic device provided by an embodiment of the present disclosure.

FIG. 16 is a schematic structural view of an electronic device provided by an embodiment of the present disclosure; as shown in FIG. 16, the electronic device 7 comprises:
- a processor 71, and a memory 72 communicatively connected with the processor 71;
- wherein the memory 72 has computer-executed instructions stored thereon; and
- the processor 71 executes the computer-executed instructions stored in the memory 72 to implement the speaking user selecting method performed by the server in the embodiments shown in FIGS. 3 to 13.

Wherein, alternatively, the processor 71 and the memory 72 are connected via a bus 73.

The related descriptions may be understood by referring to the related descriptions and effects of the steps in the embodiments corresponding to FIGS. 3 to 13, which will not be described in detail here.

Figure 17:
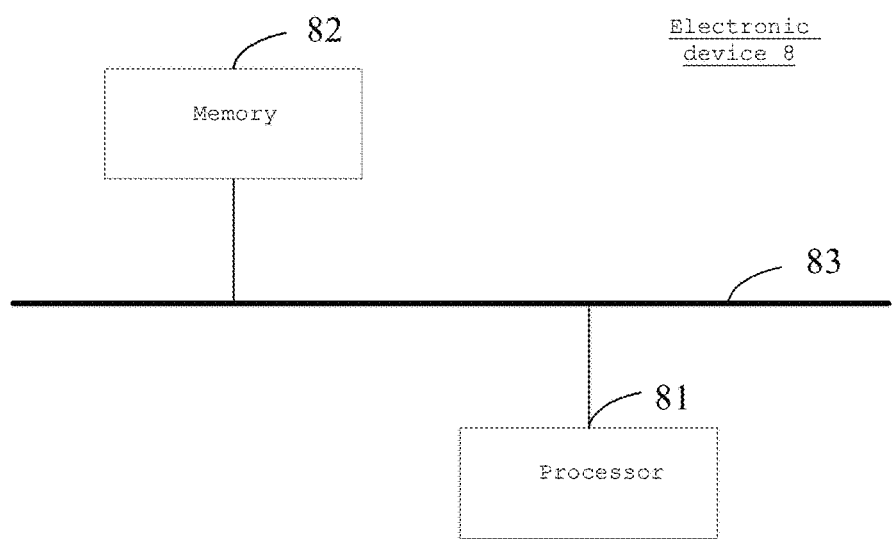
FIG. 17 is a schematic structural view of another electronic device provided by an embodiment of the present disclosure.

FIG. 17 is a schematic structural view of another electronic device provided by an embodiment of the present disclosure; as shown in FIG. 17, the electronic device 8 comprises:
- a processor 81, and a memory 82 communicatively connected with the processor 81;
- wherein the memory 82 has computer-executed instructions stored thereon; and
- the processor 81 executes the computer-executed instructions stored in the memory 82 to implement the speaking user selecting method performed by the first terminal device in the embodiments shown in FIGS. 3 to 13.

Wherein, alternatively, the processor 81 and the memory 82 are connected via a bus 83.

The related descriptions may be understood by referring to the related descriptions and effects of the steps in the embodiments corresponding to FIGS. 3 to 13, which will not be described in detail here.

Figure 18:
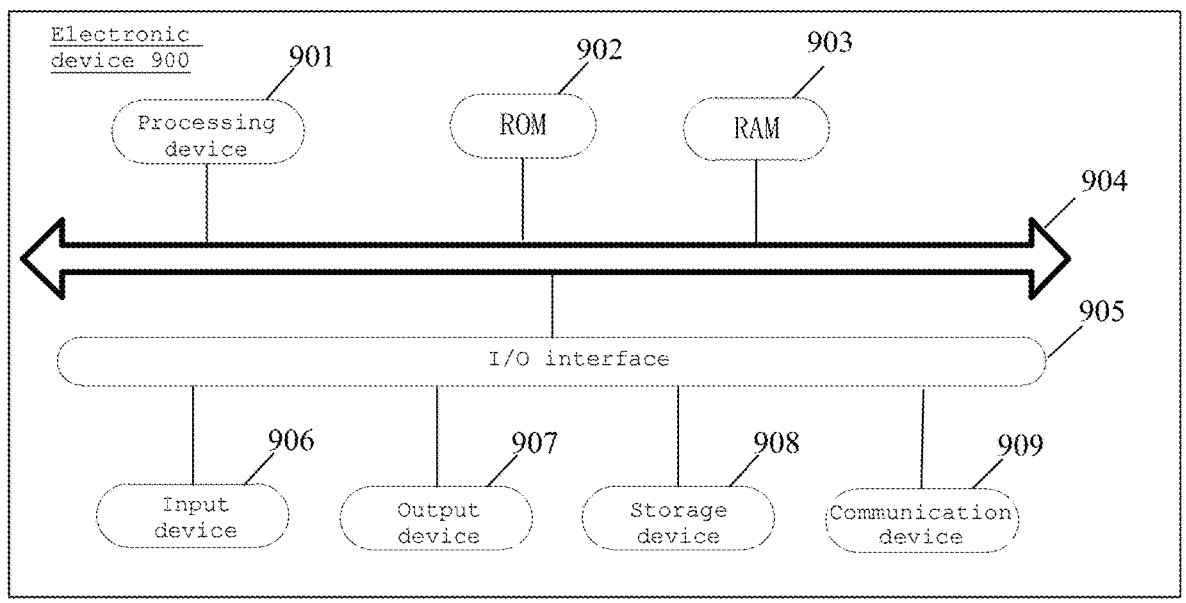
FIG. 18 is a schematic view of a hardware structure of an electronic device provided by an embodiment of the present disclosure.

Referring to FIG. 18, which shows a structural schematic view of an electronic device 900 suitable for implementing the embodiment of the present disclosure, the electronic device 900 may be a terminal device or a server. Wherein, the terminal device may comprise, but is not limited to, a mobile terminal such as a mobile phone, a notebook computer, a digital broadcast receiver, a Personal Digital Assistant (referred to as PDA for short), a Portable Android Device (referred to as PAD for short), a Portable Media Player (referred to as PMP for short) and a vehicle-mounted terminal (for example, a vehicle-mounted navigation terminal); and a fixed terminal such as a digital TV and a desktop computer. The electronic device shown in FIG. 18 which is only an example, shall not limit the functions and application range of the embodiments of the present disclosure.

As shown in FIG. 18, the electronic device 900 may comprise a processing device (for example, a central processor, a graphic processor, and the like) 901, which may perform various appropriate actions and processing according to a program stored in a Read-only Memory (referred to as ROM for short) 902 or a program loaded from a storage device 908 into a Random Access Memory (referred to as RAM for short) 903. In the RAM 903, various programs and data required for the operation of the electronic device 900 are also stored. The processing device 901, the ROM 902 and the RAM 903 are connected to each other through a bus 904. The input/output (I/O) interface 905 is also connected to the bus 904.

Generally, the following devices may be connected to the I/O interface 905: an input device 906 comprising, for example, a touch screen, a touch pad, a keyboard, a mouse, a camera, a microphone, an accelerometer, a gyroscope, and the like; an output device 907 comprising, for example, a Liquid Crystal Display (referred to as LCD for short), a speaking user, a vibrator, and the like; a storage device 908 comprising, for example, a magnetic tape, a hard disk, and the like; and a communication device 909. The communication device 909 may allow the electronic device 900 to be in wireless or wired communication with other devices to exchange data. Although FIG. 18 shows the electronic device 900 with various devices, it should be understood that there is no requirement to implement or have all the devices shown. It is possible to alternatively implement or have more or less devices.

In particular, according to an embodiment of the present disclosure, the process described above with reference to the flowchart may be implemented as a computer software program. For example, in an embodiment of the present disclosure, there comprises a computer program product, which comprises a computer program carried on a computer-readable medium, wherein the computer program contains program codes for executing the method shown in the flowchart. In such embodiment, the computer program may be downloaded and installed from the network through the communication device 909, installed from the storage device 908, or installed from the ROM 902. When the computer program is executed by the processing device 901, the above-described functions defined in the method of the embodiment of the present disclosure are executed.

It is to be noted that, the above-described computer-readable medium of the present disclosure may be a computer-readable signal medium, a computer-readable storage medium or any combination thereof. The computer-readable storage medium may be, for example, but is not limited to: an electrical, magnetic, optical, electromagnetic, infrared, or semiconductor system, device, or apparatus, or a combination thereof. More specific examples of the computer-readable storage medium may comprise, but is not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program which may be used by an instruction execution system, apparatus, or device or used in combination therewith. In the present disclosure, the computer-readable signal medium may comprise a data signal propagated in a baseband or as a part of a carrier wave, wherein a computer-readable program code is carried. Such propagated data signal may take many forms, comprising but not limited to an electromagnetic signal, an optical signal, or any suitable combination thereof. The computer-readable signal medium may also be any computer-readable medium other than the computer-readable storage medium, wherein the computer-readable signal medium may send, propagate, or transmit a program for use by an instruction execution system, apparatus, or device or in combination with therewith. The program code contained on the computer-readable medium may be transmitted by any suitable medium, comprising but not limited to: a wire, an optical cable, radio frequency (RF), and the like, or any suitable combination thereof.

The above-described computer-readable medium may be comprised in the above-described electronic device; or may also exist alone without being assembled into the electronic device.

The above-described computer-readable medium carries one or more programs, that, when executed by the electronic device, cause the electronic device to: perform the method shown in the above-described embodiments.

The computer program code for performing the operations of the present disclosure may be written in one or more programming languages or a combination thereof, wherein the above-described programming languages comprise object-oriented programming languages, such as Java, Smalltalk, and C++, and also comprise conventional procedural programming languages, such as "C" language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of network (comprising a local area network (referred to as LAN for short) or a wide area network (referred to as WAN for short)), or may be connected to an external computer (for example, connected through Internet using an Internet service provider).

The flowcharts and block views in the accompanying drawings illustrate the possibly implemented architectures, functions, and operations of the system, method, and computer program product according to various embodiments of the present disclosure. In this regard, each block in the flowchart or block view may represent a module, a program segment, or a part of code, wherein the module, the program segment, or the part of code contains one or more executable instructions for realizing a specified logic function. It should also be noted that, in some alternative implementations, the functions marked in the block may also occur in a different order from the order marked in the accompanying drawings. For example, two blocks shown in succession which may actually be executed substantially in parallel, may sometimes also be executed in a reverse order, depending on the functions involved. It should also be noted that each block in the block view and/or flowchart, and a combination of the blocks in the block view and/or flowchart, may be implemented by a dedicated hardware-based system that performs the specified functions or operations, or may be implemented by a combination of dedicated hardware and computer instructions.

The units involved in the described embodiments of the present disclosure may be implemented in software or hardware. Wherein, the names of the units do not constitute a limitation on the units themselves under certain circumstances.

The functions described hereinabove may be performed at least in part by one or more hardware logic components. For example, without limitation, the hardware logic components of a demonstrative type that may be used comprise: a Field Programmable Gate Array (FPGA), an Application Specific Integrated Circuit (ASIC), an Application Specific Standard Product (ASSP), a System on Chip (SOC), a Complex Programmable Logical device (CPLD) and the like.

In the context of the present disclosure, a machine-readable medium may be a tangible medium, which may contain or store a program for use by the instruction execution system, apparatus, or device or use in combination with the instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus or device, or any suitable combination thereof. More specific examples of the machine-readable storage medium may comprise an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In a first aspect, according to one or more embodiments of the present disclosure, a speaking user selecting method is provided and applied to a server, the method comprising:
receiving a first request sent by a first terminal device for requesting a server to determine a speaking user in a user group, wherein the user group comprises at least two candidate users, each of which corresponds to a second terminal device; determining a random selecting model corresponding to the first request, wherein the random selecting model is used to be representative of a strategy of randomly determining the speaking user from the user group; determining the speaking user from the at least two candidate users according to the random selecting model, and sending the identification information of the speaking user to the first terminal device and the second terminal device.

According to one or more embodiments of the present disclosure, the first request comprises a group identifier corresponding to the user group; the determining a random selecting model corresponding to the first request comprises: determining the number of candidate users in the user group according to the group identifier; and determining a random selecting model according to the number of candidate users in the user group.

According to one or more embodiments of the present disclosure, the determining a random selecting model according to the number of candidate users in the user group comprises: when the number of candidate users in the user group is less than a first threshold, the random selecting model is a first type of selecting model configured to determine a speaking user from all the candidate users in the user group; and when the number of candidate users in the user group is greater than a first threshold, the random selecting model is a second type of selecting model configured to determine a speaking user from some candidate users in the user group.

According to one or more embodiments of the present disclosure, the method further comprises: determining a corresponding random selecting model according to the speaking information after detecting the speaking information of the speaking user; and determining a new speaking user from the at least two candidate users according to the random selecting model corresponding to the speaking information.

According to one or more embodiments of the present disclosure, the determining a speaking user from the at least two candidate users according to the random selecting model comprises: obtaining the user information of each candidate user in the user group; determining a preferred candidate user according to each of the user information; and determining the speaking user from the preferred candidate users according to the random selecting model.

According to one or more embodiments of the present disclosure, the user information comprises a level identifier used to be representative of a user level of a candidate user; the determining a preferred candidate user according to each of the user information comprises: determining the preferred candidate user according to a level identifier of each candidate user.

According to one or more embodiments of the present disclosure, the user information comprises the record information used to be representative of a speaking record of a candidate user in the user group; the determining a preferred candidate user according to each of the user information comprises: determining the preferred candidate user according to the record information of each candidate user.

According to one or more embodiments of the present disclosure, before receiving a first request sent by a first terminal device, there further comprises: receiving a second request sent by the first terminal device, wherein the second request is used to set a candidate user in the user group.

According to one or more embodiments of the present disclosure, after receiving the second request, there further comprises: sending a third request to a second terminal device corresponding to a candidate user corresponding to the second request, wherein the third request is used to invite a user corresponding to the second request to join the user group; receiving a joining response returned by a second terminal device, and setting a candidate user corresponding to the second terminal device returning the joining response in the user group.

According to one or more embodiments of the present disclosure, there further comprises: receiving a fourth request sent by the second terminal device, wherein the fourth request is used to cause a candidate user corresponding to the second terminal device to join the user group, or to cause a candidate user corresponding to the second terminal device to withdraw from the user group.

According to one or more embodiments of the present disclosure, after determining the speaking user, the method further comprises: authorizing a speaking permission to a second terminal device corresponding to the speaking user according to the identification information of the speaking user.

According to one or more embodiments of the present disclosure, the user group comprises at least a first group and a second group, and after determining the speaking user, the method further comprises: allocating the speaking user to the first group or the second group, and sending an allocation result to the first terminal device and the second terminal device.

In a second aspect, according to one or more embodiments of the present disclosure, a speaking user selecting method is provided and applied to a first terminal device, the method comprising:

sending a first request to a server, wherein the first request is used to request the server to determine a speaking user in a user group, wherein the user group comprises at least two candidate users, each of which corresponds to a second terminal device; receiving the identification information sent by the server, wherein the identification information is used to indicate the speaking user; and highlighting a user identifier of the speaking user in a multi-user interactive interface according to the identification information.

According to one or more embodiments of the present disclosure, the multi-user interactive interface comprises a highlight display assembly; according to the identification information, the highlighting a user identifier of the speaking user in a multi-user interactive interface comprises: locating a target position of a user identifier of the speaking user in the multi-user interactive interface according to the identification information; and rendering a highlight effect at the target position through the highlight display assembly.

According to one or more embodiments of the present disclosure, before highlighting a user identifier of the speaking user in a multi-user interactive interface, the method further comprises: sequentially selecting at least one candidate user based on a preset rule, and highlighting a user identifier of the selected candidate user in the multi-user interactive interface, wherein the effect of highlighting a user identifier of each selected candidate user is maintained for a first duration.

According to one or more embodiments of the present disclosure, the sequentially selecting at least one candidate user based on a preset rule, and highlighting a user identifier of the selected candidate user in the multi-user interactive interface comprises: randomly selecting a candidate user in the user group in a loop based on a pseudo-random number, and highlighting a user identifier of each selected candidate user during a loop process in the multi-user interactive interface.

According to one or more embodiments of the present disclosure, the multi-user interactive interface comprises a random display area, and the sequentially selecting at least one candidate user based on a preset rule, and highlighting a user identifier of the selected candidate user in the multi-user interactive interface comprises: randomly selecting a candidate user in the user group based on a pseudo-random number, and displaying a user identifier of each selected candidate user during the loop process in the random selecting area.

According to one or more embodiments of the present disclosure, the method further comprises: receiving a first user instruction input through the multi-user interactive interface, wherein the first user instruction is used to add or delete a candidate user in the user group; and sending a second request to a server according to the first user instruction, wherein the second request is used to set a candidate user in the user group.

According to one or more embodiments of the present disclosure, the first request comprises a group identifier corresponding to the user group, wherein the group identifier is configured to determine a random selecting model used to be representative of a strategy of randomly determining the speaking user from the user group.

According to one or more embodiments of the present disclosure, the speaking user comprises a first speaking user, and after highlighting a user identifier of the speaking user in a multi-user interactive interface, there further comprises: displaying the first speaking information input by the first speaking user; wherein the first speaking information is used to determine a corresponding random selecting model, and the random selecting model corresponding to the first speaking information is used to be representative of a strategy of randomly determining a new speaking user from the user group.

According to one or more embodiments of the present disclosure, after displaying the first speaking information input by the first speaking user, the method further comprises: highlighting a user identifier of a second speaking user in a multi-user interactive interface, wherein the second speaking user is determined by a random selecting model corresponding to the first speaking information; and displaying the second speaking information input by the second speaking user.

In a third aspect, according to one or more embodiments of the present disclosure, a speaking user selecting apparatus is provided and applied to a server, the apparatus comprising:
- a receiving module configured to receive a first request sent by a first terminal device for requesting a server to determine a speaking user in a user group, wherein the user group comprises at least two candidate users, each of which corresponds to a second terminal device;
- a first determining module configured to determine a random selecting model corresponding to the first request, wherein the random selecting model is used to be representative of a strategy of randomly determining the speaking user from the user group;
- a second determining module configured to determine the speaking user from the at least two candidate users according to the random selecting model; and
- a sending module configured to send the identification information of the speaking user to the first terminal device and the second terminal device.

According to one or more embodiments of the present disclosure, the first request comprises a group identifier corresponding to the user group; and the first determining module is specifically configured to: determine the number of candidate users in the user group according to the group identifier; and determine the random selecting model according to the number of candidate users in the user group.

In one embodiment of the present disclosure, when determining the random selecting model according to the number of candidate users in the user group, the first determining module is specifically configured such that: when the number of candidate users in the user group is less than a first threshold, the random selecting model is a first type of selecting model configured to determine a speaking user from all the candidate users in the user group; and when the number of candidate users in the user group is greater than a first threshold, the random selecting model is a second type of selecting model configured to determine a speaking user from some candidate users in the user group.

In one embodiment of the present disclosure, the first determining module is further configured to: determine a corresponding random selecting model according to the speaking information after detecting the speaking information of the speaking user; and the second determining module is further configured to determine a new speaking user from the at least two candidate users according to a random selecting model corresponding to the speaking information.

In one embodiment of the present disclosure, the second determining module is specifically configured to: obtain the user information of each candidate user in the user group; determine a preferred candidate user according to each of the user information; and determine the speaking user from the preferred candidate users according to the random selecting model.

In one embodiment of the present disclosure, the user information comprises a level identifier used to be representative of a user level of a candidate user; when determining a preferred candidate user according to each of the user information, the second determining module is specifically configured to: determine the preferred candidate user according to a level identifier of each candidate user.

In one embodiment of the present disclosure, the user information comprises the record information used to be representative of a speaking record of a candidate user in the user group; when determining a preferred candidate user according to each of the user information, the second determining module is specifically configured to: determine a preferred candidate user according to the record information of each candidate user.

In one embodiment of the present disclosure, before receiving a first request sent by a first terminal device, the receiving module is further configured to: receive a second request sent by the first terminal device, wherein the second request is used to set a candidate user in the user group.

In one embodiment of the present disclosure, after receiving the second request, the sending module is further configured to send a third request to a second terminal device corresponding to a candidate user corresponding to the second request, wherein the third request is used to invite a user corresponding to the second request to join the user group; and the receiving module is further configured to: receive a joining response returned by the second terminal device, and set a candidate user corresponding to the second terminal device that returns the joining response in the user group.

In one embodiment of the present disclosure, the receiving module is further configured to: receive a fourth request sent by the second terminal device, wherein the fourth request is used to cause a candidate user corresponding to the second terminal device to join the user group, or to cause a candidate user corresponding to the second terminal device to withdraw from the user group.

In one embodiment of the present disclosure, after determining the speaking user, the second determining module is further configured to: authorize a speaking permission to a second terminal device corresponding to the speaking user according to the identification information of the speaking user.

In one embodiment of the present disclosure, the user group comprises at least a first group and a second group, and after determining the speaking user, the second determining module is further configured to: allocate the speaking user to the first group or the second group; and the sending module is further configured to: send an allocation result to the first terminal device and the second terminal device.

In a fourth aspect, according to one or more embodiments of the present disclosure, a speaking user selecting apparatus is provided and applied to a first terminal device, the apparatus comprising:
- a sending module configured to send a first request to a server, wherein the first request is used to request the server to determine a speaking user in a user group, wherein the user group comprises at least two candidate users, each of which corresponds to a second terminal device;
- a receiving module configured to receive the identification information sent by the server, wherein the identification information is used to indicate the speaking user; and
- a display module configured to highlight a user identifier of the speaking user in a multi-user interactive interface according to the identification information.

According to one or more embodiments of the present disclosure, the multi-user interactive interface comprises a highlight display assembly; and the display module is specifically configured to: locate a target position of a user identifier of the speaking user in the multi-user interactive interface according to the identification information; and render a highlight effect at the target position through the highlight display assembly.

According to one or more embodiments of the present disclosure, before highlighting a user identifier of the speaking user in a multi-user interactive interface, the display module is further configured to: sequentially select at least one candidate user based on a preset rule, and highlight a user identifier of the selected candidate user in the multi-user interactive interface, wherein the effect of highlighting a user identifier of each selected candidate user is maintained for a first duration.

According to one or more embodiments of the present disclosure, when sequentially selecting at least one candidate user based on a preset rule, and highlighting a user identifier of the selected candidate user in the multi-user interactive interface, the display module is specifically configured to: randomly select a candidate user in the user group based on a pseudo-random number, and highlight a user identifier of each selected candidate user during a loop process in the multi-user interactive interface.

According to one or more embodiments of the present disclosure, the multi-user interactive interface comprises a random display area, and when sequentially selecting at least one candidate user based on a preset rule, and highlighting a user identifier of the selected candidate user in the multi-user interactive interface, the display module is specifically configured to: randomly select a candidate user in the user group based on a pseudo-random number, and display a user identifier of each selected candidate user during the loop process in the random selecting area.

According to one or more embodiments of the present disclosure, the receiving module is further configured to: receive a first user instruction input through the multi-user interactive interface, wherein the first user instruction is used to add or delete a candidate user in the user group; and the sending module is further configured to: send a second request to a server according to the first user instruction, wherein the second request is used to set a candidate user in the user group.

According to one or more embodiments of the present disclosure, the first request comprises a group identifier corresponding to the user group, and the group identifier is configured to instruct the server to determine a random selecting model used to be representative of a strategy of randomly determining the speaking user from the user group.

According to one or more embodiments of the present disclosure, the speaking user comprises a first speaking user, and after highlighting a user identifier of the speaking user in a multi-user interactive interface, the display module is further configured to: display the first speaking information input by the first speaking user; wherein the first speaking information is used to determine a corresponding random selecting model, and the random selecting model corresponding to the first speaking information is used to be representative of a strategy of randomly determining a new speaking user from the user group.

According to one or more embodiments of the present disclosure, after the first speaking information is sent to the server, the display module is further configured to: highlight a user identifier of a second speaking user in the multi-user interactive interface, wherein the second speaking user is determined by a random selecting model corresponding to the first speaking information; and display the second speaking information input by the second speaking user.

In a fifth aspect, according to one or more embodiments of the present disclosure, an electronic device is provided, the device comprising:
- a processor, and a memory communicatively connected with the processor;
- wherein the memory has computer-executed instructions stored thereon; and
- the processor executes the computer-executed instructions stored in the memory to implement the speaking user selecting method as described in the first aspect and various possible designs of the first aspect above.

In a sixth aspect, according to one or more embodiments of the present disclosure, an electronic device is provided, the device comprising:
- a processor, and a memory communicatively connected with the processor;
- wherein the memory has computer-executed instructions stored thereon; and
- the processor executes the computer-executed instructions stored in the memory to implement the speaking user selecting method as described in the second aspect and various possible designs of the second aspect above.

In a seventh aspect, according to one or more embodiments of the present disclosure, a computer-readable storage medium is provided, the computer-readable storage medium having computer-executable instructions stored thereon that, when executed by a processor, implement the speaking user selecting method as described in the first aspect and various possible designs of the first aspect above, or implement the speaking user selecting method as described in the second aspect and various possible designs of the second aspect above.

In an eighth aspect, according to one or more embodiments of the present disclosure, a computer program product is provided, the computer program product comprising a computer program that, when executed by a processor, implements the speaking user selecting method as described in the first aspect and various possible designs of the first aspect above, or implements the speaking user selecting method as described in the second aspect and various possible designs of the second aspect above.

In a ninth aspect, according to one or more embodiments of the present disclosure, a computer program is provided, the computer program, when executed by a processor, implementing the speaking user selecting method as described in the first aspect and various possible designs of the first aspect above, or implementing the speaking user selecting method as described in the second aspect and various possible designs of the second aspect above.

The above description is only an explanation of preferred embodiments of the present disclosure and the applied technical principles. Those skilled in the art should understand that the scope of disclosure involved in this disclosure is not limited to the technical solutions formed by the specific combination of the above-described technical features, and at the same time should also cover other technical solutions formed by arbitrarily combining the above-described technical features or equivalent features without departing from the above-described disclosed concept. For example, a technical solution formed by the above-described features and the technical features disclosed in the present disclosure (but not limited thereto) having similar functions replacing with each other.

In addition, although the operations are depicted in a specific order, this should not be understood as requiring these operations to be performed in the specific order shown or performed in a sequential order. Under certain circumstances, multitasking and parallel processing might be advantageous. Likewise, although several specific implementation details are contained in the above-described discussion, these should not be construed as limiting the scope of the present disclosure. Certain features that are described in the context of individual embodiments may also be implemented in combination in a single embodiment. On the contrary, various features described in the context of a single embodiment may also be implemented in multiple embodiments individually or in any suitable sub-combination.

Although the present subject matter has been described in language specific to structural features and/or methodological actions, it should be understood that the subject matter defined in the appended claims is not necessarily limited to the specific features or actions described above. On the contrary, the specific features and actions described above are only exemplary forms of implementing the claims.

What is claimed is:

1. A method for selecting a user activate to speak, comprising:
    sending a first request for requesting to determine a user activate to speak in a user group, wherein the user group comprises at least two candidate users, each of which corresponds to a terminal device;
    receiving identification information, wherein the identification information is used to indicate the user activate to speak; and
    highlighting a user identifier of the user activate to speak in a multi-user interactive interface according to the identification information,
    wherein before highlighting a user identifier of the user activate to speak in a multi-user interactive interface, the method further comprises:
    sequentially selecting at least one candidate user based on a preset rule, and highlighting a user identifier of the selected candidate user in the multi-user interactive interface, wherein an effect of highlighting a user identifier of each selected candidate user is maintained for a first duration,
    wherein the multi-user interactive interface comprises a highlight display component;
    the highlighting a user identifier of the user activate to speak in a multi-user interactive interface according to the identification information comprises:
    locating a target position of a user identifier of the user activate to speak in the multi-user interactive interface according to the identification information; and
    rendering a highlight effect at the target position through the highlight display component.

2. The method according to claim 1, wherein the sequentially selecting at least one candidate user based on a preset rule, and highlighting a user identifier of the selected candidate user in the multi-user interactive interface comprises: randomly selecting a candidate user in the user group in a loop based on a pseudo-random number, and highlighting a user identifier of each selected candidate user during a loop process in the multi-user interactive interface; or
    the multi-user interactive interface comprises a random display area, and the sequentially selecting at least one candidate user based on a preset rule, and highlighting a user identifier of the selected candidate user in the multi-user interactive interface comprises: randomly selecting a candidate user in the user group based on a pseudo-random number, and displaying a user identifier of each selected candidate user during the loop process in the random selecting area.

3. The method according to claim 1, further comprising:
    receiving a first user instruction input through the multi-user interactive interface, wherein the first user instruction is used to add or delete a candidate user in the user group; and
    sending a second request according to the first user instruction, wherein the second request is used to set a candidate user in the user group.

4. The method according to claim 1, wherein the first request comprises a group identifier corresponding to the user group, wherein the group identifier is configured to determine a random selecting model used to be representative of a strategy of randomly determining the user activate to speak from the user group.

5. The method according to claim 1, wherein the user activate to speak comprises a first user activate to speak, and after highlighting a user identifier of the user activate to speak in a multi-user interactive interface, the method further comprises:
    displaying first speaking information input by the first user activate to speak; wherein the first speaking information is used to determine a corresponding random selecting model, and the random selecting model corresponding to the first speaking information is used to be representative of a strategy of randomly determining a new user activate to speak from the user group.

6. The method according to claim 5, wherein after displaying the first speaking information input by the first user activate to speak, the method further comprises:
    highlighting a user identifier of a second user activate to speak in a multi-user interactive interface, wherein the second user activate to speak is determined by a random selecting model corresponding to the first speaking information; and
    displaying second speaking information input by the second user activate to speak.

7. An electronic device comprising: a processor, and a memory communicatively connected with the processor;
    wherein the memory has computer-executed instructions stored thereon; and the processor executes the computer-executed instructions stored in the memory to implement a method for selecting a user activate to speak, the method comprising:
sending a first request for requesting to determine a user activate to speak in a user group, wherein the user group comprises at least two candidate users, each of which corresponds to a terminal device;
receiving identification information, wherein the identification information is used to indicate the user activate to speak; and
highlighting a user identifier of the user activate to speak in a multi-user interactive interface according to the identification information,
wherein before highlighting a user identifier of the user activate to speak in a multi-user interactive interface, the method further comprises:
sequentially selecting at least one candidate user based on a preset rule, and highlighting a user identifier of the selected candidate user in the multi-user interactive interface, wherein an effect of highlighting a user identifier of each selected candidate user is maintained for a first duration,
wherein the multi-user interactive interface comprises a highlight display component;
the highlighting a user identifier of the user activate to speak in a multi-user interactive interface according to the identification information comprises:
locating a target position of a user identifier of the user activate to speak in the multi-user interactive interface according to the identification information; and
rendering a highlight effect at the target position through the highlight display component.

* * * * *